(12) United States Patent
Arndt

(10) Patent No.: US 12,528,319 B1
(45) Date of Patent: Jan. 20, 2026

(54) SYSTEM FOR DISPLACEABLE MOUNTING OF OUTBOARD UTILITY EQUIPMENT TO VEHICLE WITH IN SITU ACCESS TO VEHICLE COMPARTMENT

(71) Applicant: Jason Arndt, Westminster, MD (US)

(72) Inventor: Jason Arndt, Westminster, MD (US)

(*) Notice: Subject to any disclaimer, the term of this patent is extended or adjusted under 35 U.S.C. 154(b) by 101 days.

(21) Appl. No.: 17/248,093

(22) Filed: Jan. 8, 2021

Related U.S. Application Data

(60) Provisional application No. 62/959,320, filed on Jan. 10, 2020.

(51) Int. Cl.
| | |
|---|---|
| *B60R 9/06* | (2006.01) |
| *B60D 1/07* | (2006.01) |
| *B60D 1/52* | (2006.01) |
| B60D 1/54 | (2006.01) |
| B60P 3/30 | (2006.01) |

(52) U.S. Cl.
CPC ............... *B60D 1/07* (2013.01); *B60D 1/52* (2013.01); *B60R 9/06* (2013.01); *B60D 2001/544* (2013.01); *B60P 3/30* (2013.01)

(58) Field of Classification Search
CPC .. B60R 9/06; B60R 2011/0085; B60R 11/004
USPC ............................................... 224/521; 296/3
See application file for complete search history.

(56) References Cited

U.S. PATENT DOCUMENTS

| | | | | |
|---|---|---|---|---|
| 5,358,157 A | * | 10/1994 | Abretske | B62D 43/02 |
| | | | | 224/42.21 |
| 5,375,773 A | * | 12/1994 | Lewis | B60R 9/065 |
| | | | | 239/650 |
| 5,538,168 A | * | 7/1996 | Burger | B62D 43/02 |
| | | | | 224/42.28 |
| 6,024,263 A | * | 2/2000 | Lewis, Sr. | B60R 9/06 |
| | | | | 224/502 |
| 7,118,053 B2 | * | 10/2006 | Truan | A01C 17/001 |
| | | | | 239/661 |
| 7,431,227 B2 | * | 10/2008 | Gamble, II | A01B 59/06 |
| | | | | 239/651 |

(Continued)

FOREIGN PATENT DOCUMENTS

FR           2821818 A1 *  9/2002    ............... B60R 9/06

OTHER PUBLICATIONS

FR-2821818-A1 with translation. (Year: 2002).*

*Primary Examiner* — Adam J Waggenspack
(74) *Attorney, Agent, or Firm* — Rosenberg, Klein & Lee

(57) ABSTRACT

A system is for displaceable mounting of outboard utility equipment to a vehicle for selective in situ access to a utility compartment of the vehicle includes a first portion that may be detachably fixed to the vehicle. The first portion includes a main support frame defining an access opening for unimpeded access to the utility compartment, and a hitch receiver defining a tow hitch receptacle for auxiliary equipment. A second portion is displaceably coupled to the first portion for displacement between open and closed positions relative thereto. The second portion in the closed position extends across at least a portion of the access opening and in the open position remains displaced to permit unobstructed access to the utility compartment through the access opening. The second portion includes a gate assembly to which the outboard utility equipment is attached. A latching structure releasably locks the second portion in the closed position.

18 Claims, 14 Drawing Sheets

(56) References Cited

U.S. PATENT DOCUMENTS

| | | | |
|---|---|---|---|
| 9,908,476 B2 * | 3/2018 | Ayers | B60R 9/06 |
| 10,384,499 B2 * | 8/2019 | Schocke | B60D 1/065 |
| 10,384,621 B2 * | 8/2019 | Mehlen | B60R 9/10 |
| 10,611,313 B2 * | 4/2020 | Westcott | A47J 37/0704 |
| 11,702,014 B2 * | 7/2023 | Wronski | B60R 9/06 224/509 |

* cited by examiner

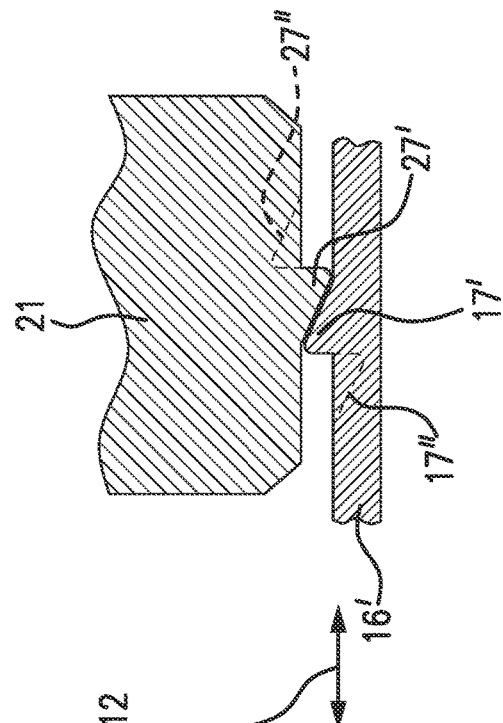
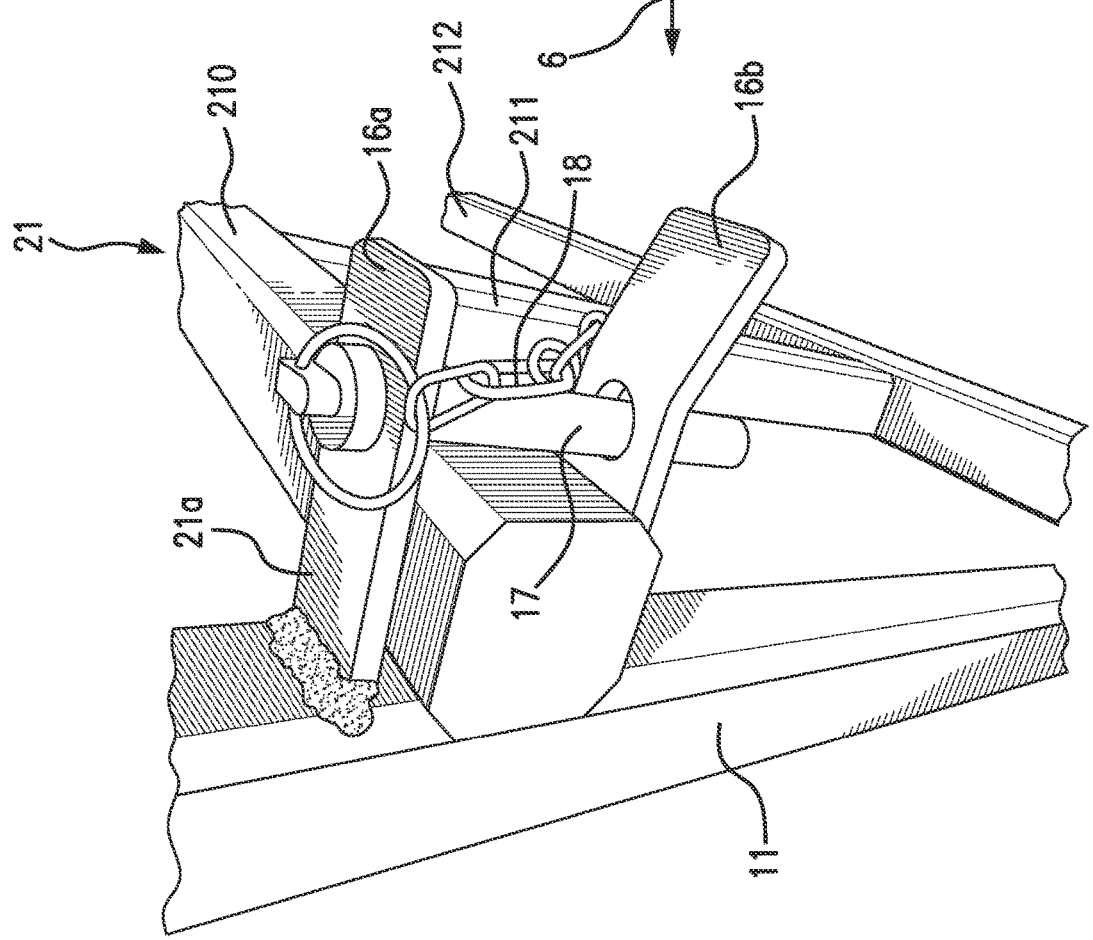
FIG. 6
FIG. 6A

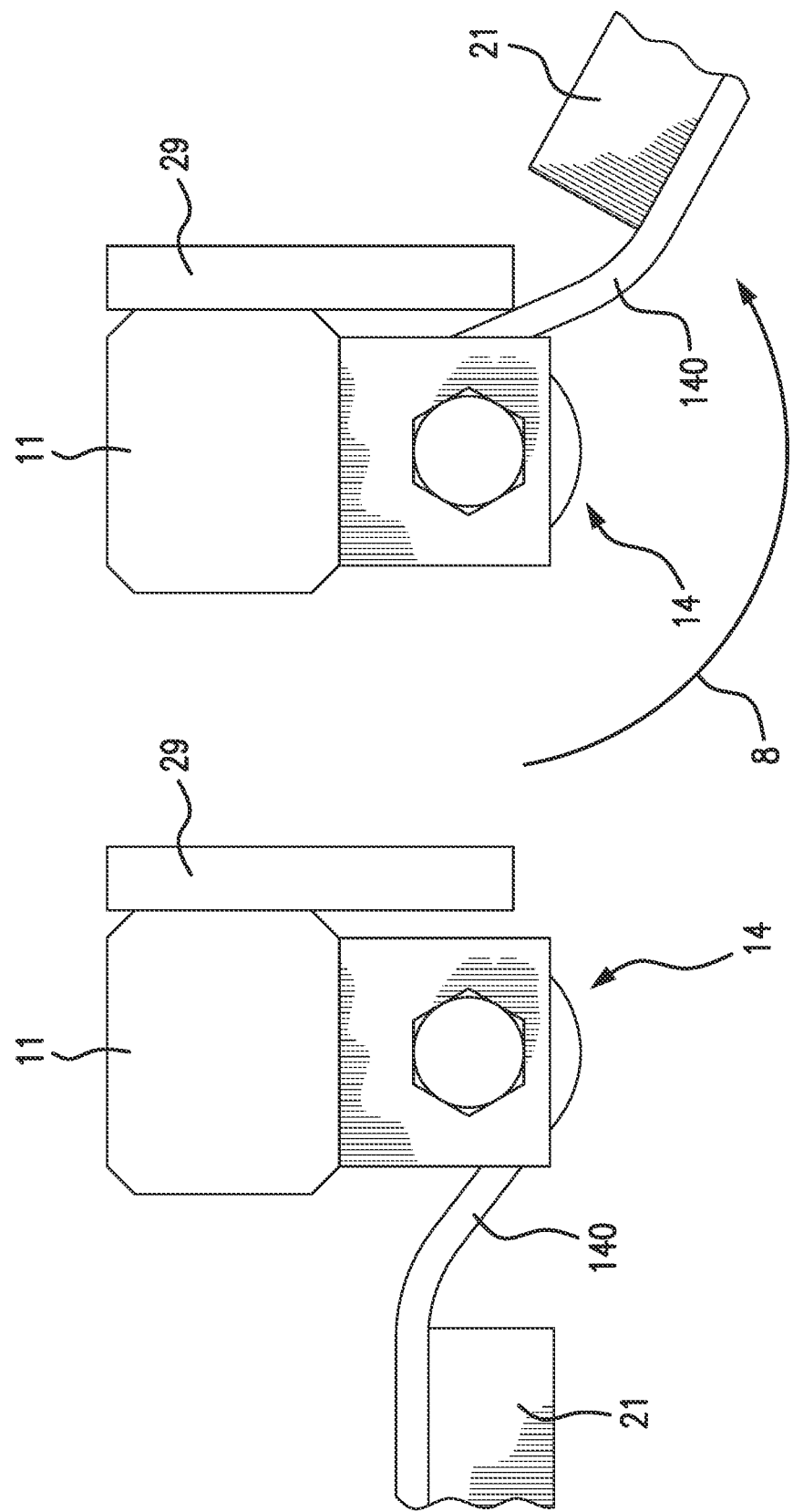

SYSTEM FOR DISPLACEABLE MOUNTING OF OUTBOARD UTILITY EQUIPMENT TO VEHICLE WITH IN SITU ACCESS TO VEHICLE COMPARTMENT

RELATED PATENTS AND APPLICATIONS

This Application is based on U.S. Provisional Patent Application No. 62/959,320, filed Jan. 10, 2020.

BACKGROUND OF THE INVENTION

The present invention is generally directed to a system for simply and inexpensively, yet safely and securely, mounting outboard utility equipment to a vehicle. More specifically, the present invention is directed to a system that provides for noninvasively mounting various utility mechanisms such as salt spreaders or the like to an outer part of the vehicle, and doing so in a way which preserves convenient access to a rear compartment of the vehicle without having to dismount or disassemble the utility mechanism from the system or vehicle. The system thus provides for various outboard utility equipment to be functionally mounted the vehicle without piercing, cutting, marking, or other destructive effect on the vehicle itself, and without impeding the vehicle's own functional utility.

Various types of outboard utility equipment are carried on surface vehicles like trucks, pickups, vans, sport utility vehicles, or the like for use during vehicle operation. These outboard utility mechanisms include salt spreaders, equipment carriers, or the like which are of substantial bulk and weight. They require strong, stable mounting to the vehicle. Particularly for heavy duty applications, they are often securely mounted to the vehicle by drilling, clamping, or other measures having destructive/disfiguring effect on the vehicle. When mounted and in place on a given vehicle, moreover, such equipment invariably blocks ready access to most if not all of the host vehicle's rear compartment. A user must either uninstall or disassemble the same from the vehicle in order to gain access to tools or supplies that may be carried in the rear compartment. This is hardly convenient, let alone possible, in the field for many heavy duty applications.

There is therefore a need for a support structure whereby outboard utility equipment may be safely and securely carried on a surface vehicle without disfiguring or otherwise damaging any part of the vehicle. There is also a need for such support structure which maintains functional operability of the supported equipment, while enabling convenient selective access to the vehicle's rear compartments without having to uninstall or disassemble the support structure.

SUMMARY OF THE INVENTION

An object of the present invention is to provide a system that supports one or more units of outboard utility equipment on a surface vehicle in secure and stable manner.

It is another object of the present invention to provide a system for supporting outboard utility equipment which may be securely coupled to a vehicle without destructive or disfiguring effect on the vehicle.

It is yet another object of the present invention to provide a system for supporting outboard utility equipment in functionally operable manner, while maintaining convenient on demand access to a compartment of the vehicle that is otherwise obstructed by the supported equipment, without requisite uninstallation or disassembly of the system.

These and other objects are attained in a system for displaceable mounting of outboard utility equipment to a vehicle for selective in situ access to a utility compartment of the vehicle. The system comprises a first portion configured for detachable coupling to the vehicle, the first portion being fixed in position relative to the vehicle when coupled thereto. The first portion includes a main support frame defining an access opening for unimpeded access to the utility compartment when coupled to the vehicle. The first portion also includes a hitch receiver defining a tow hitch receptacle for auxiliary equipment. A second portion is displaceably coupled to the first portion for displacement between open and closed positions relative to the first portion. The second portion in the closed position extends across at least a portion of the access opening and in the open position remains displaced from the access opening to maintain unobstructed access to the utility compartment therethrough. The second portion includes a gate assembly and at least one mounting bracket coupled to the gate assembly and configured for attachment of the outboard utility equipment thereto. A latching structure is coupled to the first and second portions for releasably locking the second portion in the closed position relative to the first portion.

In certain embodiments and applications, the system is provided for displaceable mounting of outboard utility equipment to a surface vehicle for selective in situ access to a cargo compartment of the vehicle. The system comprises a first portion configured for hitch mounted coupling to the vehicle, where the first portion is fixed in position relative to the vehicle when coupled thereto. The first portion includes a main support frame of substantially U-shaped contour defining an access opening for unimpeded access to the cargo compartment when coupled to the vehicle, and further includes a hitch receiver formed with a longitudinally extended tubular contour defining at one longitudinal end a tow hitch receptacle for auxiliary equipment and at another longitudinal end a tow hitch sleeve configured for telescopic coupling to a tow hitch of the vehicle. A second portion is pivotally coupled to the first portion for displacement between open and closed positions relative to the first portion. The second portion in the closed position extends across at least a portion of the access opening and in the open position remains displaced from the access opening to maintain unobstructed access to the cargo compartment therethrough. The second portion includes a gate assembly and at least one mounting bracket coupled to the gate assembly and configured for attachment of the outboard utility equipment thereto. A latching structure is coupled to the first and second portions for releasably locking the second portion in the closed position relative to the first portion.

In certain other embodiments and applications, a system is provided for displaceable tow hitch mounting of outboard utility equipment to a surface vehicle for selective in situ access beyond the outboard utility equipment without the dismounting thereof. The system comprises a first portion configured for hitch mounted coupling to the vehicle, the first portion being fixed in position relative to the vehicle when coupled thereto. The first portion includes a main support frame, and defines a tow hitch sleeve configured for telescopic coupling to a tow hitch of the vehicle. The first portion further includes a catch arm and at least one latch plate extending from the main support frame, with the catch arm being configured to retentively engage a surrounding structure when coupled to the vehicle for hanging support. The system also comprises a second portion pivotally coupled to the first portion by a hinge assembly for displacement between open and closed positions relative to said first portion. The second portion includes an arm structure configured for attachment of the outboard utility equipment thereto, as well as a hitch receiver coupled to the arm structure and formed with a longitudinally extended tubular contour defining a tow hitch receptacle for certain auxiliary equipment. The hinge assembly is offset from an end of one of the first and second portions, with the arm structure in the closed position being thereby nested longitudinally against the main support frame and supported on the latch plates extending therefrom. The second portion in the closed position is releasably locked relative to the first portion by passage of a locking pin through mutually aligned openings formed through the arm structure and said latch plate.

BRIEF DESCRIPTION OF THE DRAWINGS

FIG. 6 is an enlarged perspective view, partially cut away, of one embodiment of a latching structure employed in the system as shown in FIG. 1;

FIG. 6A is an enlarged sectional view schematically illustrating a portion of an alternate embodiment of a latching structure employed in the system as shown in FIG. 1;

FIG. 7A is an enlarged plan view, partially cut away, of the hinge assembly and surrounding structure as shown in FIG. 7, in a closed position of a gate assembly of the system;

FIG. 7B is an enlarged plan view, partially cut away, of the hinge assembly and surrounding structure as shown in FIG. 7, in a fully open position of a gate assembly of the system;

DESCRIPTION OF THE PREFERRED EMBODIMENTS

Figure 1:
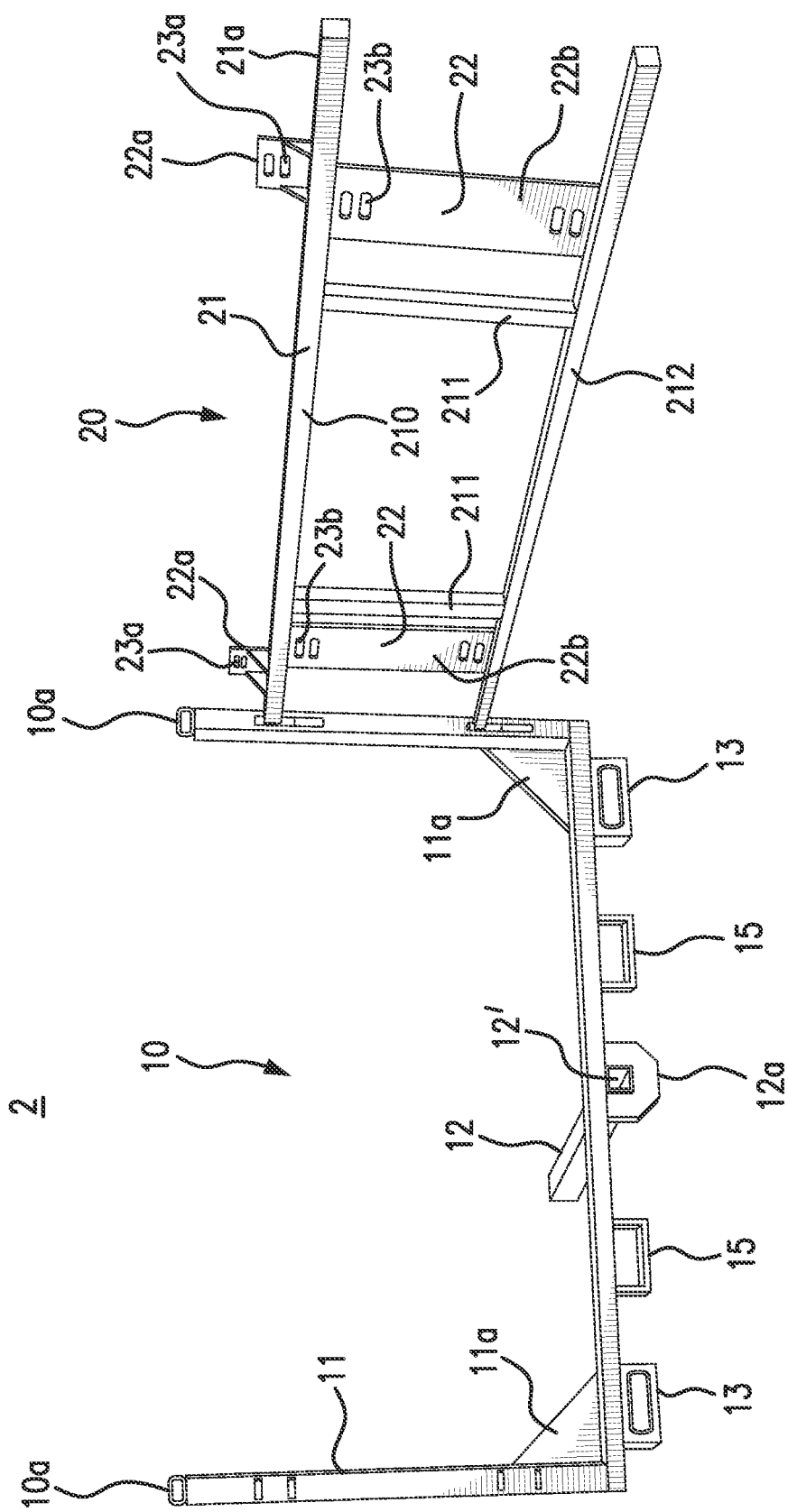
FIG. 1 is a perspective view of a system formed in accordance with but one exemplary embodiment of the present invention, with a second portion of the disclosed system disposed in an open position relative to a first portion of the system.

The subject system is generally directed to a system for simply and inexpensively, yet safely and securely, mounting outboard utility equipment to a vehicle. More specifically, the system provides for a structural assembly which enables the noninvasive mounting of salt spreaders and various other utility mechanisms known in the art externally to the vehicle. The system itself is suitably mounted, such that it preserves convenient access to a rear compartment of the vehicle while remaining installed in place and operational. That is, the user may configure the system to access the vehicle's rear compartment without dismounting or disassembling the utility mechanism from the system or vehicle, nor uninstalling or disassembling the system from the vehicle. The system thus enables various functional outboard utility equipment to be mounted to the vehicle without disfiguring the vehicle, and to remain functionally mounted without impeding the vehicle's own functional utility.

The system may be used for mounting any known outboard utility equipment for suitable use and operation with various surface vehicles. The system finds particularly efficient use for mounting outboard utility equipment having one or more mechanisms such as salt spreaders to vehicles like trucks, pickups, vans, sport utility vehicles, and others. Such vehicles often have wider ranges of use apart from dedicated use with the given utility mechanism; hence, their seasonal/temporary use with these types of outboard utility mechanism may not justify invasive mounting measures normally used for more permanent fixtures which require drilling, clamping, or other destructive effect on the vehicle.

Moreover, such vehicles are typically equipped with highly functional compartments additionally or exclusively accessible from outside the vehicle. These may be compartments may be located on the vehicle for external access from the rear or other parts of the vehicle and provide, for instance, valuable utility space for storage of tools and supplies. Maintaining convenient ready access to a vehicle's cargo or other utility compartment like this is normally quite important in practice. Yet, access to such utility compartment is often at least partially obstructed or otherwise impeded by the outboard utility equipment mounted to the vehicle, at least without having to dismount or disassemble some part of the equipment.

In accordance with certain aspects of the present invention, the system provides for a structural assembly configured for detachable mounting to a vehicle equipped with a tow hitch. The outboard utility mechanism carried by the structural assemble is thereby detachably hitch mounted to the vehicle. The structural assembly is sufficiently reconfigurable to mount the utility mechanism to the vehicle in this manner while maintaining selective access to the vehicle's rear compartment, even with the outboard utility mechanism remaining fully assembled and in situ on the vehicle. When access to the compartment is needed, the user may simply move the outboard utility mechanism out of the way, while it remains secured to the structural assembly mounted to the vehicle.

Referring now to FIGS. 1-10, there are shown various views illustrating examples of the subject system formed in accordance with various alternate embodiments of the present invention for certain illustrative applications. Some of the views illustrate exemplary embodiments of the system configured for the secure mounting of certain examples of the numerous outboard utility equipment types that may be supported. Examples of such outboard utility equipment include salt spreader mechanisms, other equipment carriers, and the like. Some views show embodiments of the system with a salt spreader mechanism secured thereto, prior to mounting to the vehicle. Other views schematically illustrate the system embodiment with secured salt spreader mechanism together hitch-mounted/installed as a unit to the vehicle. Given suitable similarities between vehicles, the detachable hitch-mounting enables the system to be transferable from one vehicle to another.

Various views show the vehicle-installed system being sufficiently reconfigurable that the mounted utility mechanism (salt spreader mechanism in the examples illustrated) may be displaced between an operational position and a non-operational position relative to the vehicle. In the non-operational position, the mounted utility mechanism is displaced out of the way to provide ample clearance to open a rear door, tailgate, hatch, or the like for accessing a cargo or other utility compartment of the vehicle (a rear compartment, for example, in the illustrated applications which may comprise enclosed cabin space or open truck bed space). Preferably, suitable measures are employed to provide reinforcing support when necessary to avoid undue mechanical stress on weight bearing moving parts of the system like hinge joints, where a portion of the system might otherwise remain suspended above the ground in the non-operational position.

Figure 2:
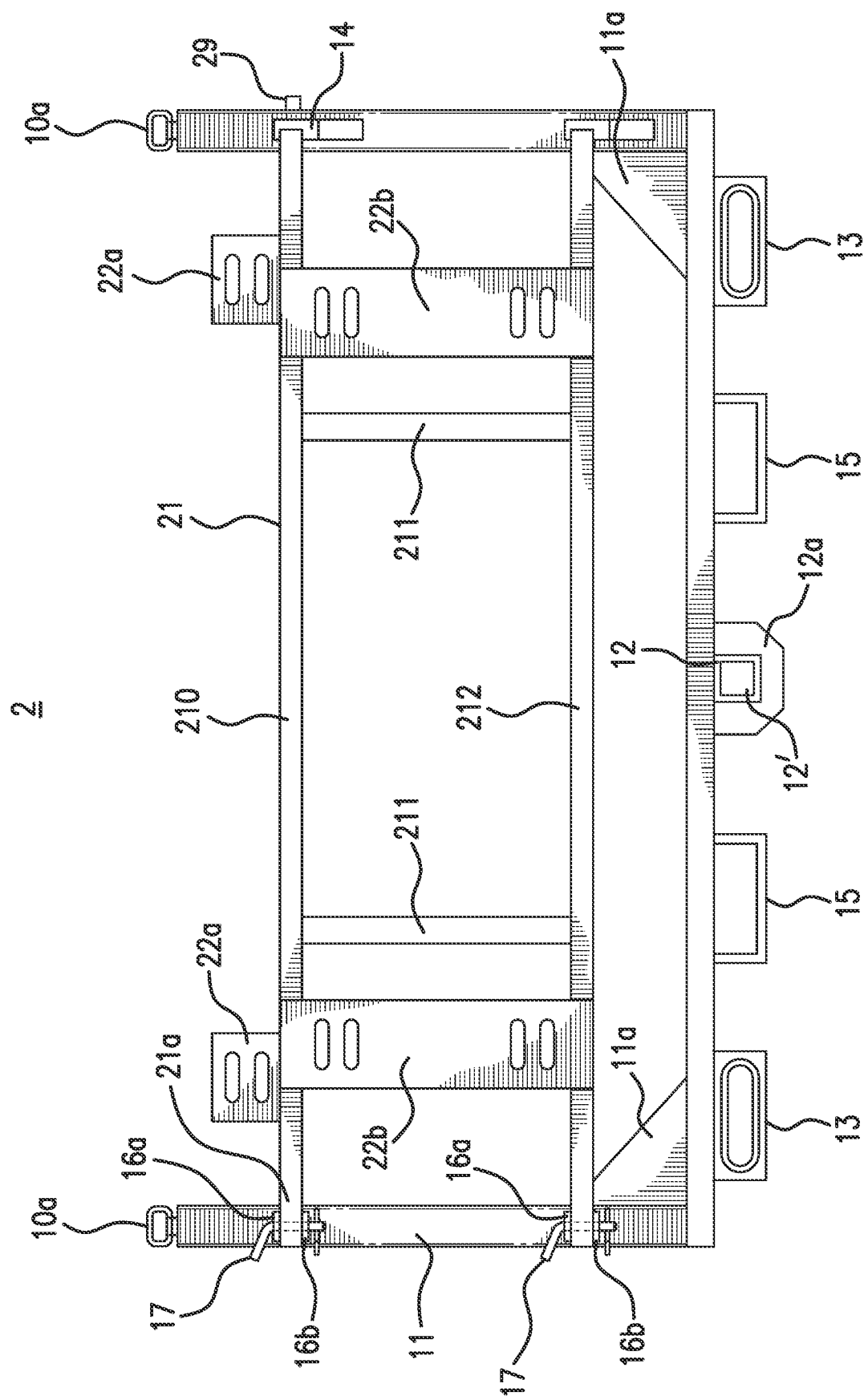
FIG. 2 is an elevational view of the embodiment of FIG. 1, with a second portion disposed in a closed position relative to a first portion.
Figure 3:
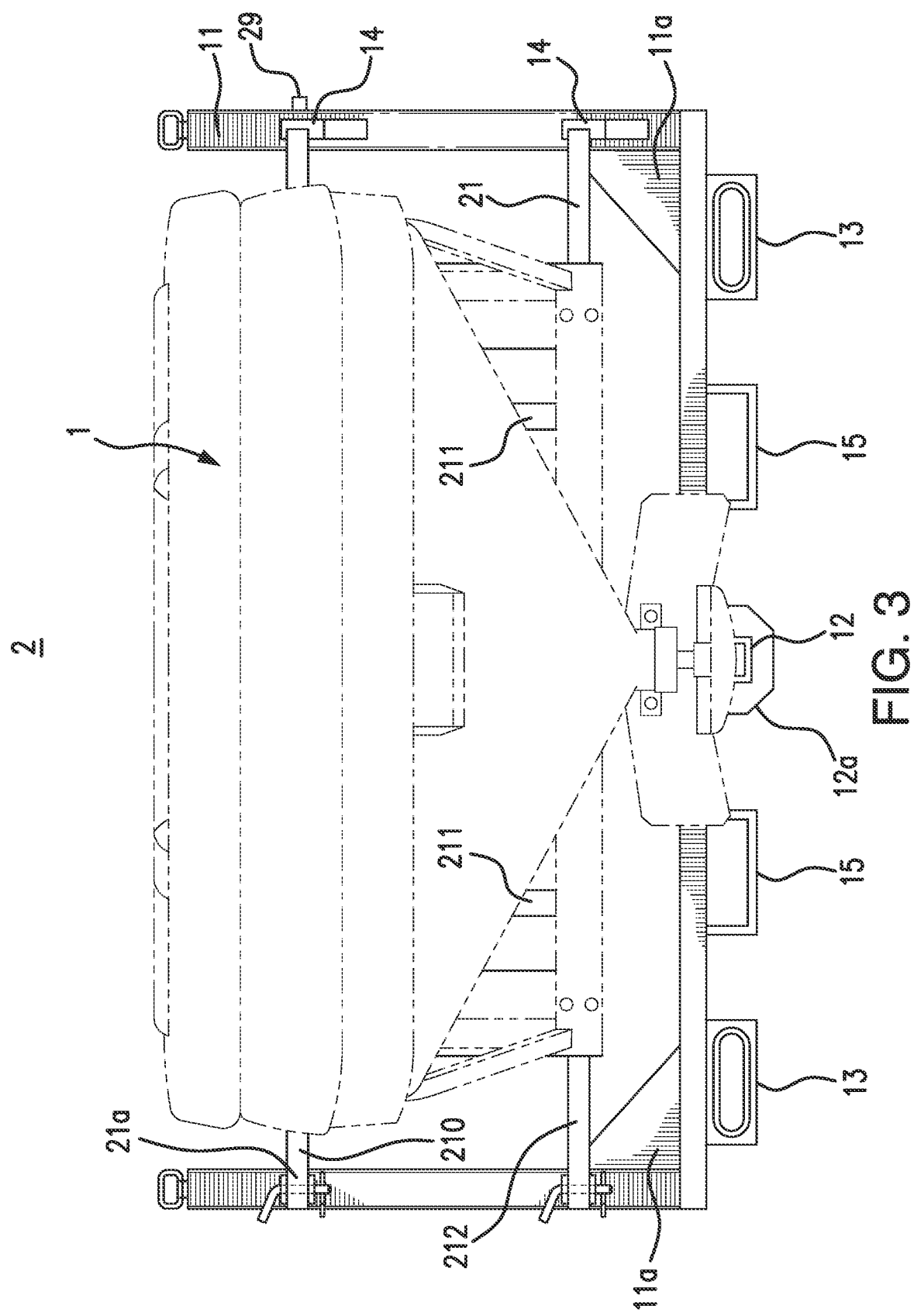
FIG. 3 is an elevational view of the embodiment as shown in FIG. 2, with a conventional salt spreader mechanism for outboard operation schematically shown mounted for illustrative purposes.
Figure 4:
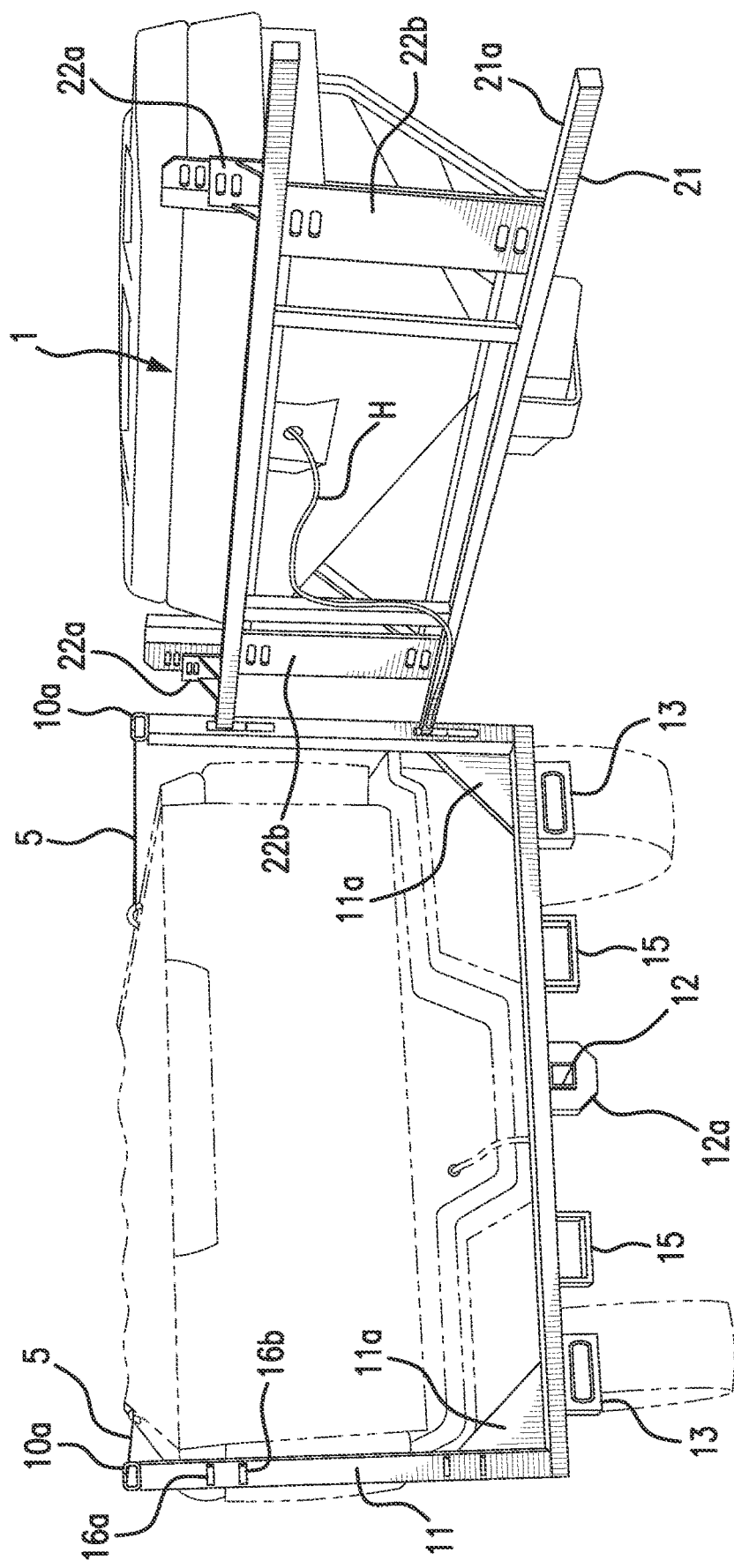
FIG. 4 is a perspective view of the embodiment as shown in FIG. 1, as installed for outboard operation to the rear of a pickup truck type vehicle in one exemplary application, shown with a conventional salt spreader mechanism for outboard operation mounted for illustrative purposes and a tailgate of the vehicle closed.
Figure 5:
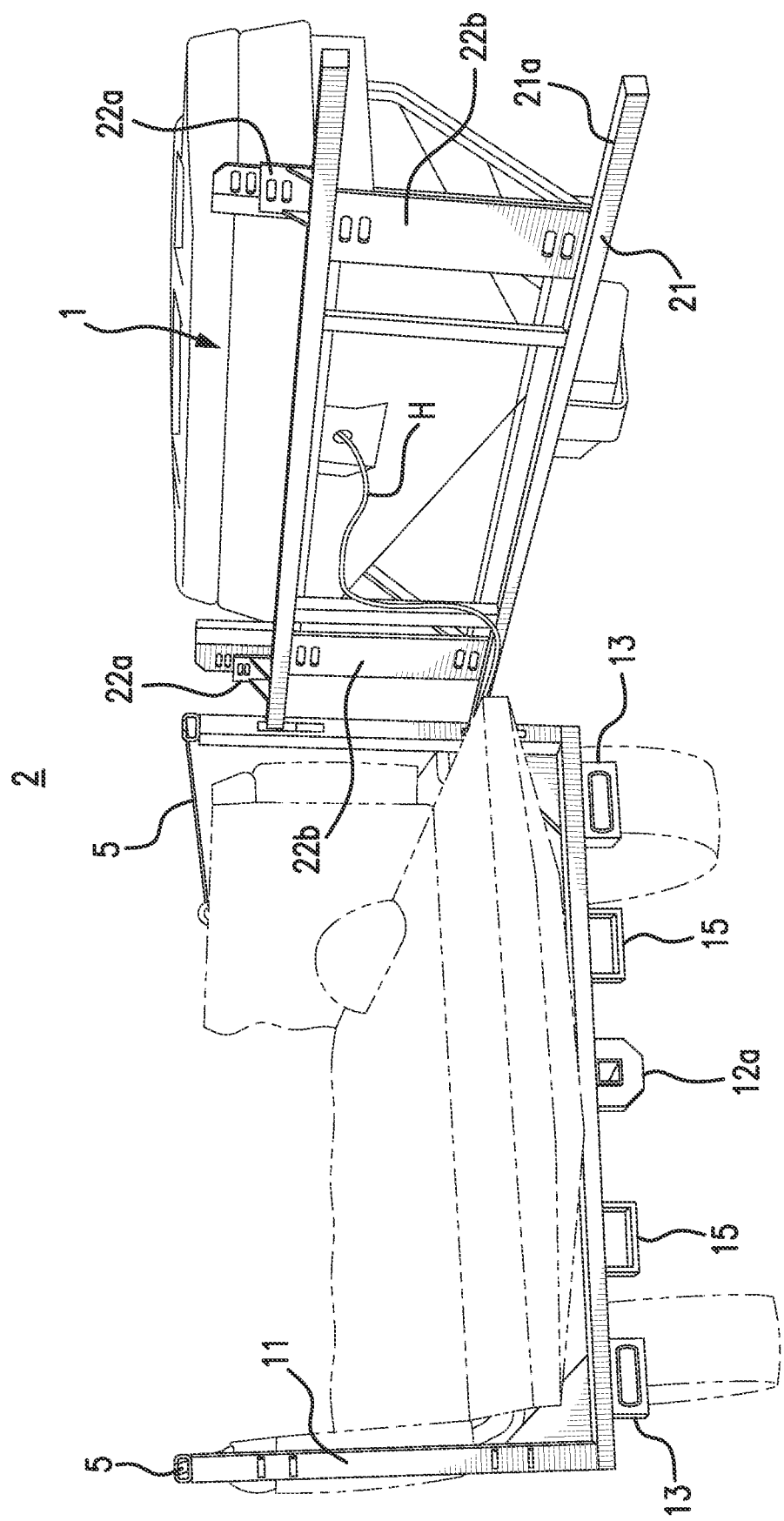
FIG. 5 is a perspective view of the embodiment as shown in FIG. 4, but with the tailgate of the vehicle open through an access opening defined by the first portion of the disclosed system.

Referring to FIGS. 1-7B, there is shown a system 2 formed in accordance with but one of numerous exemplary embodiments of the present invention. The system 2 in the illustrated embodiment and application is configured to accommodate the displaceable support of a conventional salt spreader mechanism 1. In other embodiments, other known utility mechanisms may be accommodated depending on the particular requirements of the intended application. In FIGS. 4-5, the system 2 is schematically shown illustratively mounted to a conventional pickup truck type vehicle having an open rear bed compartment accessed by a rear hatch that may be opened or closed. The system 2 is illustrated respectively in its opened position to permit unimpeded opening of the rear hatch and free access to the vehicle's rear compartment.

Typical of commercial grade, vehicle-carried salt spreader mechanisms 1 known in the art, with its salt storage compartment and spreading hardware, are bulky and heavy enough that even when not loaded with salt, they cannot be safely picked up or handled by an ordinary adult individual. System 2 forms a structure of sufficient strength, rigidity, toughness, and rugged durability to suitably support such significant salt spreader mechanism 1 for safe operational mounting to a vehicle. In this embodiment as well as others illustrated herein, structural members of system 2 are preferably though not necessarily formed of one or more metallic materials like steel, iron, or the like (or combinations thereof), which are preferably applied with suitable surface treatment or cover to better withstand repeated exposure to environmental elements during use.

As noted, system 2 is formed to mount for use on the given vehicle securely yet noninvasively. For instance, one need not bolt any part of the system to one's truck. In certain known mounting systems for salt spreaders, installation requires bolting the system to portions of a truck's top rails and rear bumper. System 2 in contrast utilizes the truck's existing tow hitch, or other similar attachment structure of comparable strength. System 2 in this embodiment includes a lower portion which engages the truck's tow hitch, and an upper portion defining attachment points. The system may be further stabilized by securing by strapping down the attachment points to existing fixtures of the truck like tie down hooks/eyelets and the like. No drilling or other invasive fastening measures are needed to secure the system (and its supported outboard utility mechanism) to the vehicle for safe operation.

In broad concept, system 2 attaches conveniently to the vehicle's existing tow hitch, and is heavy duty enough to readily support the outboard utility equipment and its mechanism. The system may be used with utility mechanisms of various type and configuration. Preferably, the system is formed with sufficiently universal structure to accommodate the mounting of a wide range of available outboard utility equipment options. The system generally includes a stable fixed first portion 10 formed to include a rigid frame structure 11 to which a second portion 20 is displaceably coupled in releasably locked manner. The first portion 10 is fixedly mounted to the given vehicle's tow hitch, and the second portion 20 receives and secures the given outboard utility equipment 1 thereto. During periods of both operation and non-operation of the equipment, the second portion 20 may be closed relative to the first portion 10, such that the outboard utility equipment 1 is positioned on or across a part of the vehicle—preferably, the rear part of the vehicle in the embodiment and application shown. Where a vehicle compartment thus normally obstructed by the utility equipment during operation needs to be accessed, the user may simply release the second portion 20 of the system from its locking engagement with the first portion 10, and displace the same relative to the fixed first portion 10. This clears the way for access to the previously obstructed vehicle compartment.

In the exemplary embodiments shown, the second portion 20 of the system preferably forms a gate-like structure 21 which is displaceably coupled to the first portion to displace between open and closed position. Preferably though not necessarily, the gate-like structure 21 is coupled by pivotally hinged coupling to the first portion to swing open and closed. When closed, the second portion 20 is latched to the first portion 10 to remain securely in place, and keep the utility equipment 1 mounted thereon securely in place. When the second portion 20 is swing out of the way, and where the vehicle is a pickup truck for example (such as illustrated in FIGS. 4-5), the user is able to freely reach and open the tailgate so as to freely access the bed of the truck. Even where the vehicle is rugged and heavy duty enough to hold the utility equipment 1, users are often reluctant to bolt or otherwise fasten anything directly to the body or other intrinsic component of the vehicle itself, especially in the case of such substantial equipment. The subject system 2 thus avoids such direct disfiguring mounting to the vehicle and supports the utility equipment 1 without sacrificing security or stability of mounting. System 2 does so while permitting the full range of use and access to open the tailgate for loading or retrieving payload in the truck bed without any dismantling of the mounted utility equipment 1.

In certain applications, and where the vehicle is equipped with attachment fixtures, supplemental tie downs or other suitable measures known in the art may be used to further stabilize the system's support of the given utility equipment 1. Regardless of application, system 2 serves much as a mounting adaptor which enables secure yet selectively displaceable mounting of the utility equipment 1 to the vehicle.

Hitch mounted carriers are known in the art. Particularly in the context of cycling, tow hitch mounted bike carriers are known in the art. Certain known carriers are mounted via the tow hitch in a way that permits the carrier to be tilted down out of the way so that a rear hatch/tailgate of a sport utility vehicle may be opened and closed without having to unload the bikes, or tilted up to retract against the rear hatch/tailgate for stowage when no bikes are being carried. But such known carriers are incapable of stable yet displaceable/reconfigurable mounting of outboard utility equipment in the manner provided by the subject system 2. Among other things, they fail to maintain stable mounting of utility equipment that may be operated during vehicle use, while permitting convenient displacement of the equipment to freely access the rear (or other) compartment of the vehicle all the while the outboard utility equipment remains fully mounted.

Figure 10:
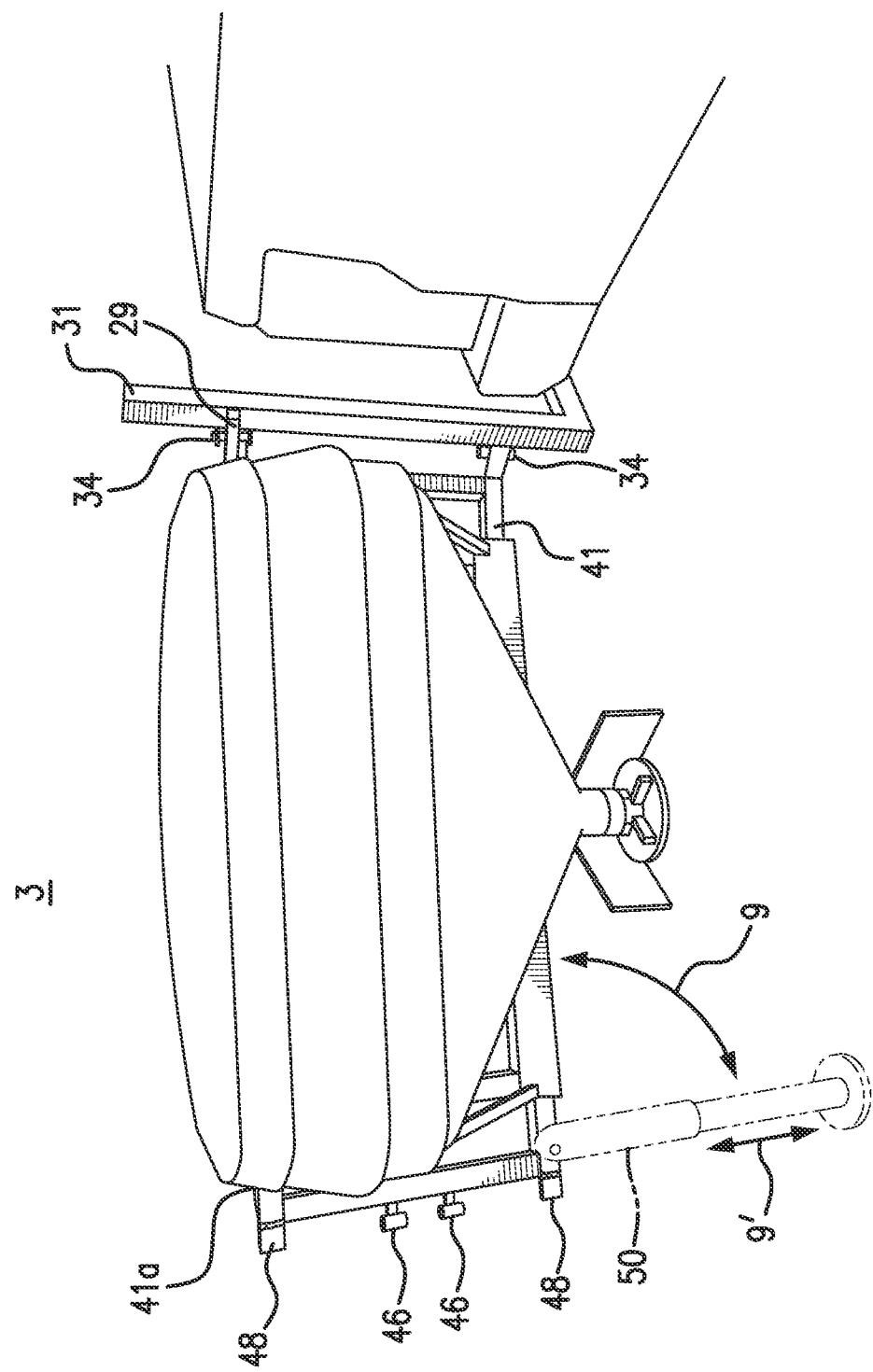
FIG. 10 is a perspective view from an outer side of the embodiment shown in FIG. 9, in a fully open position.

The system preferably includes suitable measures for guarding against the gate-like second portion 20 from hyper extension beyond a preset displacement limit when swinging open from its closed position. If the vehicle were disposed on a hill or other inclined surface, for instance, there may be significant risk, otherwise, of hyper extension to the point of even swinging around and banging against a side of the vehicle. Accordingly, system 2 preferably includes a stopper extension/member 29 (such as schematically illustrated in FIGS. 7A-7B, 10) at or near the second portion's hinged coupling to the first portion 10, against which the gate-like second portion 20 bears once it opens to a corresponding position limit. The stopper member 29 stops the second portion 20 from displacing any further past that estopped position limit.

The first portion 10 of system 2 forms a main support frame assembly 11 which includes a hitch receiver 12 to engage the vehicle's tow hitch (not shown) while providing a receptacle for other auxiliary hitch-mountable equipment. The main support frame 21 is thereby firmly mounted to the vehicle. The second portion 20 of system 2 forms a gate assembly 21 which in this embodiment is configured to accommodate the particular salt spreader mechanism 1 shown, but in other embodiments may be configured to alternatively or more universally accommodate different salt spreader or various other types of utility mechanisms known in the art. The main support frame 11 is preferably formed with a plurality of hinges 14 coupled thereto (welded in this embodiment for optimal strength) for holding the gate 21 in proper pivotally displaceable alignment therewith. A free end 21a of the gate 21 is configured to receive one or more drop pins to be latched/locked in releasable manner to the main support frame 11 when in a closed position thereagainst.

A plurality of eyelets 10a are preferably formed at upper portions of the main support frame 11, so that stabilizing straps 5 coupled to suitable attachment points on the vehicle may be hooked to them for added stability of the main support frame 11. In the embodiment of FIGS. 4-5, for example, the system 2 is shown mounted to the back of a pickup truck, where the truck is equipped with certain hardware about its rear bed. Straps may be run from the eyelets 10a to respective tie down loops provided on/about the truck bed, its bumper, or any other suitable fastening point for firm retention of the support frame's otherwise free upper ends.

The main support frame 11 in the disclosed embodiment preferably defines a substantially U-shaped contour much like that of a football field goal post. For the particular application shown, the field goal post structure is widened sufficiently to accommodate the given utility mechanism 1. As the system 2 and utility mechanism 1 together may collectively be large and wide enough to block the vehicle's taillights, supplemental taillights 13 are preferably provided on the main support frame 11 with suitable electrical coupling via the vehicle's electrical tow harness/connector.

The salt spreader mechanism 1 is thereby installed for use on system 2 by firmly mounting to the system's gate 21, which in turn is hingedly coupled to the system's main support frame 11. As shown in FIGS. 3-5, system 2 thus mounts the salt spreader mechanism 1 for outboard operation onto the rear of the vehicle (a pickup truck in this example). This is preferably by secure yet detachable engagement with the vehicle's tow hitch assembly. With the gate 21 latched in its closed, operative position as illustrated in FIG. 2, the spreader mechanism 1 supported to hang off of the gate 21 as shown for operation. When the gate 21 is unlatched and swung out to its opened, inoperative position as illustrated in FIG. 1, the spreader mechanism 1 is likewise swung by the gate 21 out of the way of the vehicle compartment to permit the tailgate to be swung open for user access.

In FIGS. 3-5, the vehicle installed system 2 is viewed from the back of the vehicle. In FIGS. 4-5, the system 2 is shown with its gate 21 swung away from the main support frame 11, to its fully opened position. Only the field goal post-shaped main frame 11 remains directly behind the truck's tail gate/back door. The tail gate area immediately behind the truck is thereby cleared and unobstructed, so that it may be freely opened and closed, and the truck's cargo compartment freely accessed. The main support frame 11 is configured so that its frame members surround the tail gate, with enough clearance to avoid obstructing its movement.

The framework of the salt spreader mechanism 1 in this embodiment and application is carried fully on the gate 21 for displacement therewith. The gate 21 in this embodiment extends across the back of the vehicle and defines more or less a rectangular framework, though it may be formed with other shapes and configurations depending on the particularly intended application, to best accommodate the particular type/configuration of the utility equipment 1 at hand. Suitable attachment hardware known in the art, such as U bolts, clamps, fasteners, or the like may be employed to securely affix the utility equipment 1 to the gate 21.

The gate 21 is preferably equipped with a plurality of mounting brackets 22 which are positioned and configured as needed to suit the particular structural features of the given spreader mechanism 1 to be supported. The mounting brackets 22 are formed in the illustrated embodiment to include face plates 22a, 22b that define planar mounting surfaces for the spreader mechanism 1 to bear against. The mounting face plates 22a, 22b having openings 23a, 23b to receive such U bolt or other attachment hardware for firmly securing the spreader mechanism 1 thereagainst. The spreader mechanism's body may also be U bolted or otherwise clamped to the upper and/or lower horizontal beam 210, 212 of the gate 21 to further secure against the same. Certain portions of the spreader mechanism 1 may alternatively be more permanently secured to the gate 30. For example, certain parts of the spreader mechanism's framework may welded to corresponding parts of the gate 21 to prevent unauthorized removal or theft.

In alternate embodiment, the gate 21 may be provided with one or more mounting brackets 22 formed as angled brackets which accept and cradle the utility mechanism for secure mounting thereto. In certain embodiments, the mounting brackets 22 may be positioned and configured to protrude out far enough to serve incidentally as a stopping structure for the gate 21 when it swings open. That is, the mounting bracket 22 nearest the hinges 14 may protrude sufficiently from the gate 21 that it contacts a part of the main support frame 11 when the gate 21 is swung far enough out, and thereby stopped against further swing. This would be at an angular position (relative to the main support frame 11) well before the spreader mechanism 1 hanging off the gate 21 could contact the side of the truck as a result of the gate's being swung open. Hence, the need for a separate stopper member 29 may be obviated.

In other embodiments affording more universal application with variously sized and configured utility mechanisms, mounting brackets 22 may be omitted. Yet in other embodiments, mounting brackets 22 may be alternatively provided with adjustable configuration to adaptively suit variously sized and configured utility mechanisms 1.

As noted, the system's main support frame 11 includes a hitch receiver 12 which serves the dual function of both engaging the vehicle's tow hitch for detachably mounting the system, and providing a substitute hitch receiver in place of the vehicle's hitch that it is occupying. In that sense the hitch receiver 12 serves as a hitch extender for the vehicle, for the hitch-mounting of other equipment even with system 2 installed. The hitch receiver 12 is accordingly formed in the illustrated embodiment with a longitudinally extended tubular contour defining a tow hitch receptacle at one end and a tow hitch sleeve at the other longitudinally opposed end.

When the system 2 is installed, an inner, forward directed end of the receiver 12 extends to define a hitch sleeve that mates with the vehicle tow hitch's receptacle opening, preferably in telescopically (coaxially) coupled manner. A cotter pin or the like is then used to lock the coupling. Meanwhile an outer, rear-directed end of the hitch receiver 12 is configured to receive other hitch-mountable equipment while the system remains installed on the vehicle. The hitch receiver may be suitably configured in this regard to accommodate any vehicle-equipped tow hitch of conventional/standard size and shape. In the example shown, the hitch receiver 12 is sized and shaped for a standard 2 inch rectangular hitch size. In other embodiments and applications, the hitch receiver 12 may be shaped and sized, for example, to accommodate other tow hitch configurations, such as a 2.5 inch square hitch receiver size for heavier truck applications.

Certain applications may involve heavy duty trucks and utility equipment, with substantially rugged and weighty components. Still, it is preferable to carry no more weight than needed. The system is preferably though not necessarily formed with an open frame structure towards optimizing the system in terms of strength to weight ratio. The frame members are preferably formed with ample thickness and heavy duty structure to support the loads and stresses potentially encountered in the particularly intended applications. In the embodiment shown, for example, numerous portions of system 2 employ hollow frame members with suitable wall thickness, such as a ¼" steel wall thickness. Where necessary, supplemental/reinforcement members or bracing measures may be employed to maximize structural rigidity and minimize structural deflection or flex.

The hinges 14 employed in the embodiment shown are also of a suitable type known in the art having sufficient strength and heavy duty structure to provide reliable operation and ample support despite the combined weight of the gate 21 and salt spreader mechanism 1 (and the mechanism's payload). The hinges 14 are suitably structured to support a fully loaded gate 21 even when it is laterally suspended to apply heavily cantilevered forces and stresses (on those hinges 14) after being unlatched and swung open as shown in FIGS. 1 and 4-5, suspended away from the main support frame 11. In the embodiment shown, for example, hinges 14 may be employed which are rated to withstand 1000 pounds of such force for suitable load capacity and ample durability. The gate 21 may be freely displaced about the hinges between opened and closed positions relative to the main support frame 11 without loss of structural integrity/stability.

By way of illustrative example, a typical salt spreader mechanism 1 alone might weigh at least about 120-150 pounds depending on the spreader type and duty level. Some commonly available spreader mechanisms may hold up to about 600 pounds of salt when fully loaded. Conventional spreader mechanisms 1 are also typically equipped with a motor driven spreader which rotates to discharge the salt outward. The motor drive is ordinarily energized by onboard vehicle power made available through a conventional electrical power harness H and connector (see for example FIGS. 4-5) of suitable type known in the art. These additional components add to the weight.

To enhance strength and structural integrity, the gate 21 preferably includes one or more vertical support beams 211 disposed and configured to provide intermediate support for the utility mechanism to be secured to the gate 21, and to reinforce the gate's overall rigidity. The gate 21 is thus structured to resist twisting, sagging, or otherwise deflecting under operational load.

Moreover, the first and/or second portions 10, 20 of the system may be reinforced by one or more plate- or shield-like members, or gussets 11a, 12a. One such gusset plate 12a is shown in the illustrated embodiment at the base of the hitch receiver 12. The gusset 12a serves to 'beef up' the structure at that part of the main support frame 11 (or gate 21 if provided there with one or more gussets) for greater strength and stability.

The main support frame 11 in this embodiment is preferably also formed with a plurality of corner gussets 11a for reinforced strength and heavier duty use. More specifically, the corner gussets 302 provide reinforcement for the upright bars of the main support frame 11 for when its gate 21 swings open and shut. As noted, the main support frame 11 is formed with uprights on which eyelets 10a are formed for stabilizing strap attachment.

Additionally in this embodiment, a plurality of pockets 15 are formed on the main support frame 11 to serve as lifting slots to receive, for instance, the lifting forks of a forklift, by which the system 2 may be lifted for mounting, dismounting, or other handling. Most forklifts provide for adjustable relative placement of its lifting forks, so the pockets 15 are positioned in this embodiment to be evenly spaced about a center of the main support frame 11, and spaced by a predetermined spacing that falls well within the typical separation distance ranges of the lifting forks in most forklifts. For example, the pockets 15 may be disposed about the centrally disposed tow hitch receiver 12 and positioned approximately 36" apart. In the embodiment shown, the pockets are each preferably formed as rectangular structures welded or molded adjacent a lower member of the main support frame 11.

In certain other embodiments and applications, additional pockets 15 may be provided as additional engagement options to accommodate forks with different dimensions and configurations, though they may be prohibitively limited in number by their added weight. Alternatively, the pockets 15 may be adjustably configured, such as by slidable coupling to the main support frame 11, if realized without unduly compromising strength or adding weight. The pockets 15 may also be replaced by alternate structures like eyelets which may be simply hooked onto for lifting.

As in certain other embodiments, the hitch receiver 12 in this embodiment is open on its outer/rear end. The opening 12' defined by the hitch receiver 12 then serves also as a hitch extender for the vehicle. Depending on the embodiment and application, system 2 may or may not provide sufficient structural rating for another vehicle to be safely towed using such hitch extension, but the hitch extension would at least allow for supplemental coupling of other hitch mounted equipment where needed. Perhaps even a small trailer may be towed thereby, without having to uninstall system 2 from the truck. For example, the hitch extension may accommodate a temporary step to enable a user to reach the top of the salt spreader mechanism 1, or otherwise accommodate an auxiliary mechanical device, a third brake light, or the like.

Referring to FIG. 6, one exemplary embodiment of a latching structure that may be employed for gate 21 is shown. This latching structure is formed with one or more sets of paired latch plates 16a, 16b for retentively capturing a structural member of the gate 21 therebetween. Where two sets of latch plates are employed as illustrated, each of the upper and lower lateral members 210, 212 of the gate 21 defines a terminal free end at the gate's latching end 21a. Each of the free ended lateral frame members 210, 212 inserts between one set of these paired latch plates 16a, 16b. A locking drop pin 17 may then be inserted through corresponding holes formed in the paired latch plates 16a, 16bb to lock the gate's upper or lower lateral member 210, 212 in place therebetween. The locking drop pin 17 shown in this view is of different structure than shown in FIGS. 2-3 to illustrate the various forms that such pin 17 may take. As in the other views, the locking drop pin 17 is preferably tethered to the main support frame 11 or gate 21, such as by a retention chain 18 or the like, to keep from being lost when not in use.

One or more of the latch plates 16a, 16b may be formed with an outwardly flared or similarly tapered structure to help guide entry of latching end 21a member therebetween. In the embodiment shown, for instance, the lower latch plate 16b is formed with such outwardly and downwardly flared guiding structure. This guiding structure defines a smooth ramp along which the given member at the gate's latching end 21a may be pushed up and onto the more level parts of the latch plate 16, even when it may be slightly 'sagging' due to the weight of the gate 21 and load it carries.

In certain alternate embodiments, such as illustrated in FIG. 6A, the latching structure may be simplified to employ complementary locking elements on mutually opposed engaging surfaces of the main support frame 11 and gate 21. Such locking elements may be employed at any weight bearing surface interface between the main support frame 11 and gate 21 other than at the latching end 21a, depending on the requirements of the particularly intended embodiment and application. These locking elements when brought together are biased into retentive mutual engagement by the weight of the gate 21 and the utility equipment that may be carried thereon. The complementary elements would effectively be weight biased effectively into interlocking engagement, and may both be formed as protrusive elements, or one element may be formed as a protrusive element with the other as a recessed feature configured to retentively receive the other protrusive element.

In the example schematically illustrated in FIG. 6A, the opposed element each include a protrusive ramp feature, which may be of any suitable shape to facilitate slidable contact when the two elements are urged into and out of locking engagement with one another. Two protrusive elements 17', 27' in this example define complementarily sloped ramp features on mutually opposed surfaces of the main support frame 11 and gate 21. For stability of interface, complementary recesses 17", 27" may be formed into the opposed surfaces to provide mutually conformed seating and enhance interlocking strength. The protrusive elements 17', 27' may be provided as shown, formed respectively on a latch plate 16' and a lateral member of the gate 21. The ramp features of these elements 17', 27' may be brought against each other and slidably advanced (as indicated by the arrows 6) one over the other until they fall into mutually locked engagement beyond the apex of their ramp features. At that point, the gate 21 would effectively be latched closed. Such latching engagement may be released thereafter by slightly lifting and displacing the free end 21a of the gate 21 to move the ramp feature of its protrusive element 27' up and onto the complementary ramp feature of the protrusive element 17'. Further displacing the gate 21 (as indicated by the arrows 6) advances its ramp feature along then off of the ramp feature of the main support frame's protrusive element 17' until the free end 21a of the gate 21 clears and draws away from the main support frame 11.

Figure 7:
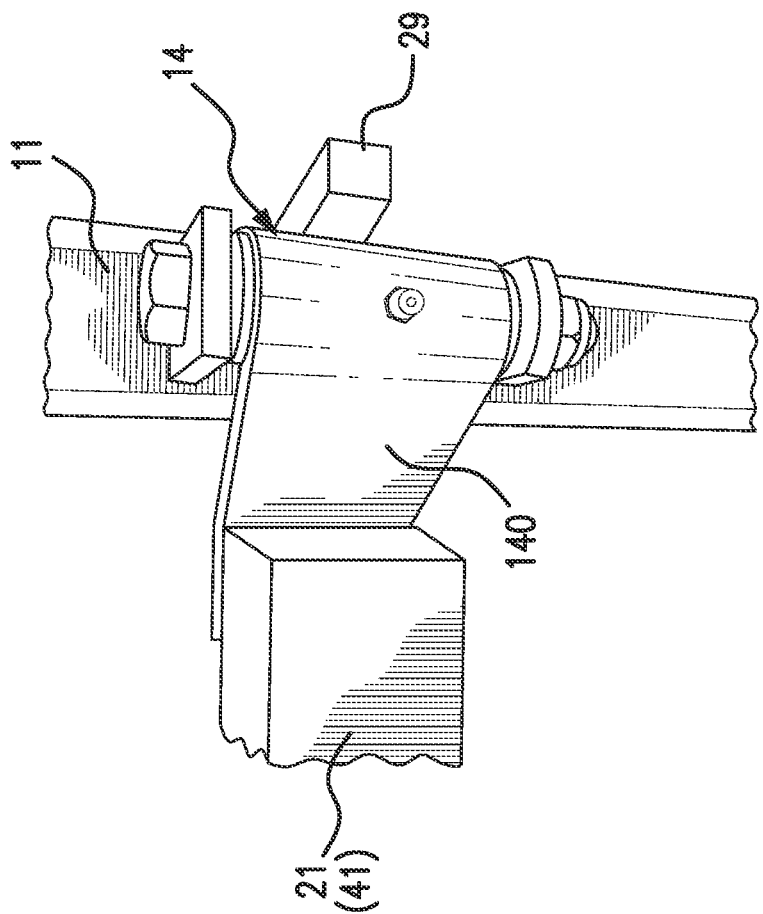
FIG. 7 is an enlarged perspective view, partially cut away, of one embodiment of a hinge assembly and surrounding structure as employed in the system as shown in FIG. 1.

Referring to FIGS. 7 and 7A-7B, system 2 also includes on its main support frame 11 a stopper extension/member 29 which limits displacement of the gate 21 beyond a predetermined positional limit. In the illustrated embodiment, a stopper member 29 in the form of a bar segment (such as the square solid stock shown) is disposed on the main support frame 11 adjacent one of the hinge assemblies 14. The stopper member 29 projects out from the nearest part of the main support frame 11 to form effectively a bumper such that when the gate 21 swings open along the arrow 8 to an angular position disposed, say 120-130 degrees angularly from its closed position, a part of the gate 21 or hinge 14 (such as hinge plate 140 projecting radially from the hinge 14) is stopped by the projecting bumper formed by the stopper member 29. The gate 21 is blocked and may swing away no farther. This prevents the gate 30 from swinging wildly open enough for the utility mechanism it is carrying to impact and damage or hurt a side of the vehicle, surrounding structures, or even bystanders.

In the illustrated embodiment, the hinge plate 140 is configured to project laterally outward from at least one hinge assembly 14. The hinge plate 140 is preferably formed of suitably strong and rigid metal material to withstand the momentum of a gate 21 bearing a fully loaded utility mechanism 1 making forceful impact against the bumper end of the stopper member 29 when swung (angularly displaced) away from the main support frame 11. This hinge plate 140 which displaces with the gate 21 is fixed in position and configuration relative to that gate 21. Thus, the position at which the hinge plate 140 contacts the stopper member 29 is correspondingly fixed. In certain alternate embodiments and applications, the hinge plate 140 may be adjustably disposed in angular or linear position relative to the gate 21, or in its structural configuration, such that it may contact the stopper member 29 when the gate 21 is at differently adjusted angular position limits relative to the main support frame 11. Alternatively, the hinge plate 140 may be fixed as in the illustrated embodiment, but the stopper member 140 is adjustable in length of projection or in its position on the main support frame 11 to adjust the positional limit for the gate 21 (relative to its closed position on the main support frame 11).

Regarding the hinges 14 employed in this embodiment, each hinge 14 is preferably of a suitable enclosed assembly type known in the art. They are heavy duty hinge assemblies made for supporting heavy doors which are internally sealed with a lubricant. They are preferably welded onto the gate 21 via their hinge plates 140, though each hinge assembly 14 is detachably coupled to the main support frame 210 by hinge bolts releasably locked in place with corresponding nuts. If the gate 21 must be removed from the main support frame 11, the hinge bolts may be loosened and removed from hinge sleeves of the main support frame 11 to free and remove the gate 21, while leaving the main support frame 11 hitch mounted to the truck.

Figure 8:
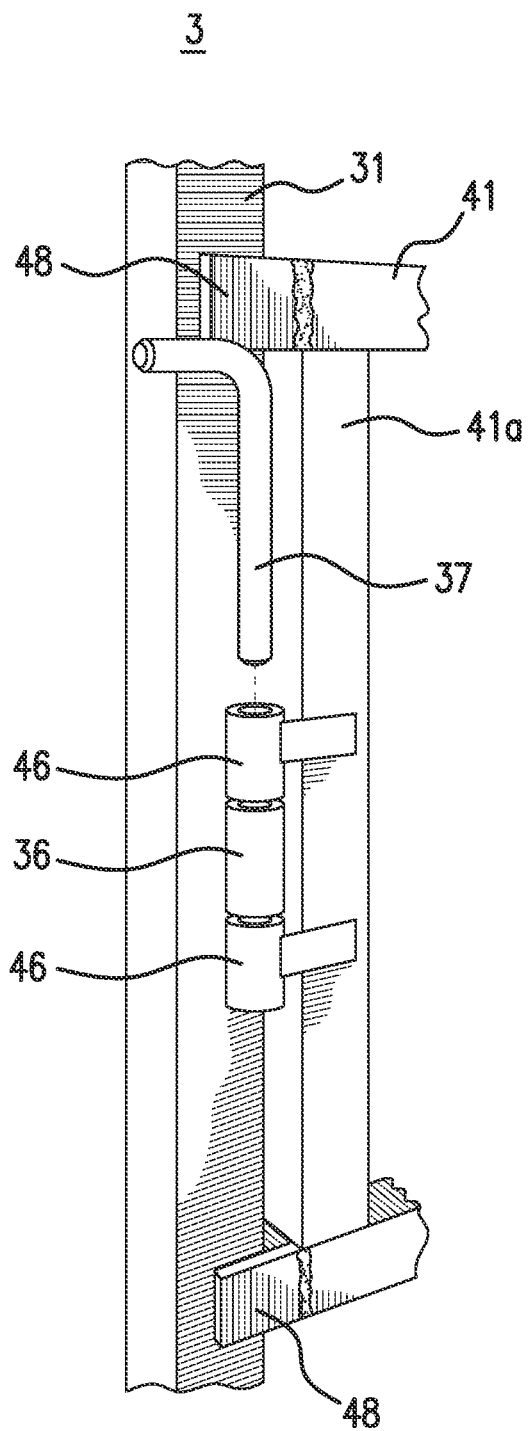
FIG. 8 is an enlarged and exploded perspective view, partially cut away, of an another alternate embodiment of a hinge assembly and surrounding structure as employed in the system formed in accordance with an alternate embodiment of the present invention, shown in FIGS. 9-10.
Figure 9:
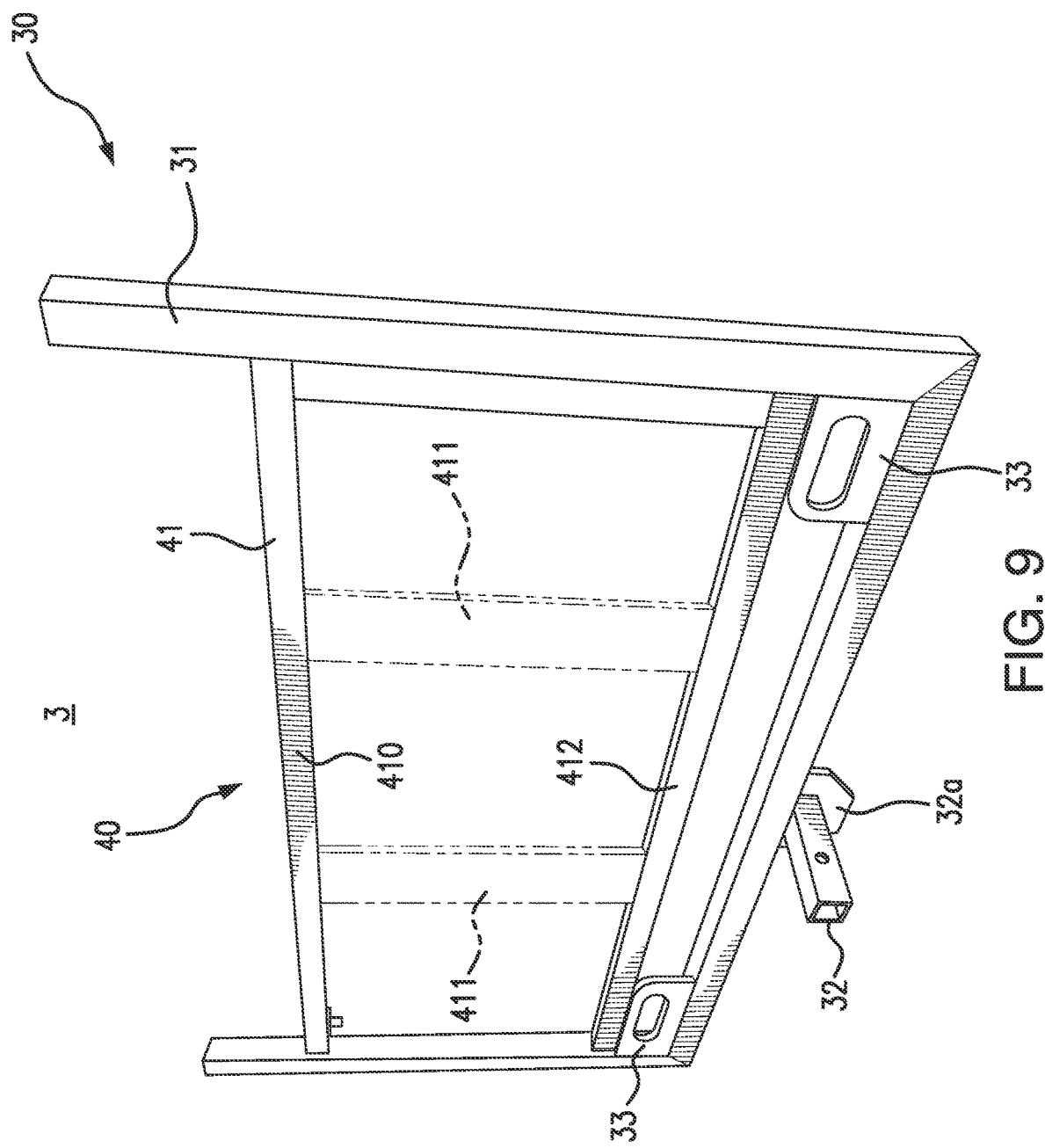
FIG. 9 is a perspective view from an inner side looking rearward of a system formed in accordance with an alternate embodiment of the present invention.

Turning now to FIGS. 8-10, there is illustratively shown a system 3 formed in accordance with an exemplary alternate embodiment of the present invention. System 3 is similar in overall structure with the system disclosed in the preceding embodiment, including a first portion 30 forming a stationary support frame 31 and a second portion 40 displaceably coupled to the first portion 30, to form a gate-like structure 41. This gate 41 is formed as shown with upper or lower lateral member 410, 412 and one or more one or more vertical support beams 411 as needed to provide ample intermediate support and rigidity for the utility mechanism to be safely secured to the gate 41. System 3 is preferably configured as well with a hitch receiver 32 having both a receiving end (to define a hitch extender reinforced by a surrounding a shield-like gusset 32*a*) and a hitch sleeve end for hitch-mounted detachable coupling to a vehicle. As in the preceding embodiment, system 3 may be mounted to various types of surface vehicles, including for instance, pickup trucks, sport utility vehicles, utility box trucks, or the like which have prominent compartments that are normally obstructed from ready external access when carrying certain outboard utility equipment. In the case of utility box trucks, for example, a prominent rear storage compartment, or cargo bay, is accessed through a pair of rear doors, which are obstructed by an outboard utility mechanism 1 that may be carried for back-directed use off the rear of the truck. With system 3 is installed on the vehicle (via detachable tow-hitch mounting), such an outboard utility mechanism 1 would be carried on the system's gate 41 for ready displacement out of the compartment doors' way without disassembly, uninstallation, or compromise in stability of support for the mechanism.

When the gate 41 is opened away from the system's main support frame 31, clearance is provided for the rear doors of the truck to be freely opened and access conveniently gained to the rear compartment to store or retrieve tools, salt, or whatever else may be held there. In this application, stabilizing straps may be attached to the eyelets (not shown) provided on the main support frame 31 and tied down to the truck's bumper or other part, depending on the particularities of the given truck. As in the preceding embodiment, a stopper member 29 is disposed as shown on the main support frame 31 to keep the gate 41 from destructive and hazardous hyper-extension when swung open, beyond a safe positional limit relative to the frame 31.

Depending on the particular vehicle on which it is installed, the configuration and dimensions of system 3 may not be extensive enough to obstruct the truck's taillights in applications such as this. Hence, system 3 is shown in FIG. 9 with taillight brackets 33 defining openings through which supplemental taillights may be passed and held if needed. Or, in other applications with smaller vehicles, the taillight brackets 33 may be suitably aligned with vehicle's own taillights for them to be visible through its openings. In the illustrated embodiment, the brackets 33 are situated to each serve the added function as a reinforcing gusset at the junction of horizontal and vertical members of the main support frame 31.

As shown in the enlarged view of FIG. 8, the latching structure in this embodiment is collectively formed by at least one first sleeve 36 formed to extend from the main support frame 31 and at least one second sleeve 46 formed to extend from a free end 41*a* of the gate 41. In the illustrated embodiment, one first sleeve 36 is formed to extend from the main support frame 31, while two second sleeves 46 are preferably formed to extend from the gate 41. When the gate 41 is fully closed against the main support frame 31, the first and second sleeves 36, 46 are sufficiently aligned to coaxially receive a latching drop pin 37 inserted therethrough for releasably locking the gate closed. When the latching drop pin 37 is removed, the gate 41 is released to be swung open.

As also shown in FIG. 8, the free end 41*a* of the gate 41 in this embodiment bears against the main support frame 31 when fully closed. The gate 41 is preferably formed with one or more stopping plates 48 which serve to limit the gate's closure relative to the main support frame 31. This not only prevents the gate 41 from displacing too far towards the truck to cause potential damage, it also positions the first and second sleeves 36, 46 of the latching structure in coaxial alignment. Each stopping plate 48 may be formed as an overlapping extension of a frame member. In this configuration, the stopping plate 48 serves much like a door jamb which prevents the gate 41 from closing beyond that part of the surrounding frame 31 it stops against. Once the stopping plate 48 is drawn close enough to or against the main support frame 31, the locking drop pin 37 may be dropped into and through the latching structure's aligned sleeves 36, 46 to lock the gate closed.

As illustrated in FIG. 10, system 3 in this or other embodiments may include suitable measures to provide supplemental support for the gate 41 while it remains swung open and projecting away from the main support frame 31. The full weight of the gate 41 and utility mechanism 1 would otherwise be fully supported by the main support frame 31 only through the hinges 34. Given the load of a typical salt spreader mechanism 1 and possibly the salt payload it may be carrying, the stress and strain on the hinges 34 may be relieved by one or more support legs 50 extending from the gate 41 at or near its free, latching end 41*a*. Preferably, such support leg(s) 50 may be folded or pivotally swung against the gate 41 when not in use, but when needed may be swung down from the gate 41 to support its freely suspended end against the ground/road surface below (as indicated by the arrows 9). In certain embodiments and applications, the support leg 50 may also be adjustable in length as indicated by the arrows 9' to adapt to variations in ground/road surface elevation due to the surface being inclined or otherwise not consistent. The support leg 50 in those cases may be formed, for instance, with a telescoped structure whereby one segment may be extended or retracted as needed then releasably locked in place by a suitably coupled locking pin, ratchet, latch, or the like.

During use of the system installed on a vehicle in various embodiments disclosed herein, and with a fully loaded utility mechanism mounted to its gate, the resulting weight and bulk of the gate presents a potential hazard in the field if not released with care for opening. For example, a gate loaded mounted with a salt spreader mechanism fully loaded with salt could easily yield a total weight on the order of about 600 pounds. If the vehicle were parked at even a slight incline to bias the gate towards a releasing/opening direction, such a heavy free swinging loaded gate could inflict serious harm to nearby persons or property.

Hence, suitable protective measures such as the protrusive, complementarily ramped mutually engaging pieces at the gate's interface with the main support frame when closed may be employed. The heavy loading makes the gate inertially more difficult to open anyway, but such added protective measures help lessen risk when conditions might otherwise heighten the potential hazards. In addition to the mutually engaging pieces already noted, various other suitable measures known in the art which may be employed include for instance the use of a finger-like member, an arcuate bump, a tab, or knob that holds the gate closed unless defeated by a certain degree of deliberately applied force.

In the embodiments shown, the user must apply a slight lifting force to overcome the mutual engagement between the gate and a latch plate of the main support frame. This task is simpler when the salt spreader mechanism is empty and does not pose a great danger. But when the salt spreader mechanism is loaded down by a full tank of salt, the task becomes considerably more difficult-commensurate with the greater danger posed by the heavier load on the gate. The added protective measures which bias the gate to its closed position serves to compensate for situations like unfavorable incline of the ground surface which might otherwise make the gate more prone to opening on its own.

To allow for the slight lifting of the gate at its free/latching end, the gate's hinged coupling allows for slight vertical play in this regard (say about ¼" or so vertical displacement at that end). The hinges preferably allow for such degree of tolerance.

Another alternative protective measure includes a flexible tie such as a chain or strap by which the distal end part of the gate may be hung for support from the eyelets or other upper part of the main support frame, if the gate is to be left open for an extended period of time. Providing ample slack in such tie and keeping it connected between the gate and a suitable part of the main support frame at all times may serve to limit the gate's opening distance, and thereby help guard against runaway opening of the gate. The tie would then function much like a safety chain or harness.

In certain embodiments, the gate itself may be adjustable in configuration to make it more universally mountable with various types of outboard utility equipment. The gate in such embodiments may include one or more movable backing plates, brackets, or mounting panels for adaptively optimizing the utility equipment's mounting thereto. In certain other embodiments, certain frame members (such as those forming the top and bottom lateral rails) of the main support frame are equipped with mounting members which hookingly engage and hang from the frame members, much like wreath hangers hung to be suspended from an upper edge of a door. The mounting members may be disposed at selected spots along the frame members and releasably locked in place by a bolt or clamp. The mounting members are formed with a plurality of attachment holes to which the given utility mechanism may be suitably attached.

The mounting member when loaded down by the utility mechanism attached to it would tend to remain in place by mechanical bias. A locking bolt underneath or the like to keep the mounting member from shifting, jumping, or other potentially disturbing movement may be all that is actually necessary to secure it in practice.

Figure 11:
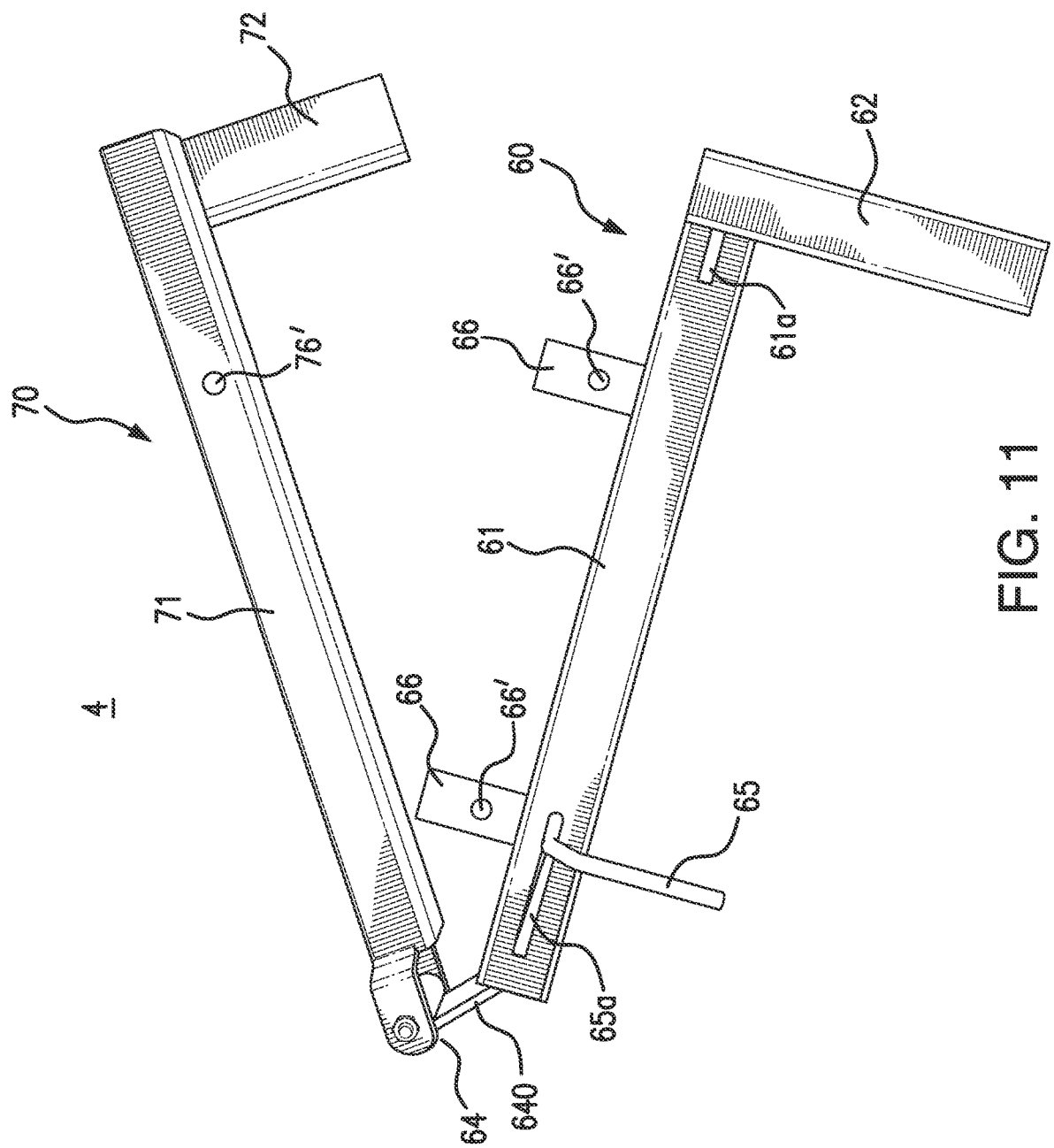
FIG. 11 is a perspective view looking downward of a system formed in accordance with another alternate embodiment of the present invention, shown in a partially open configuration.
Figure 12:
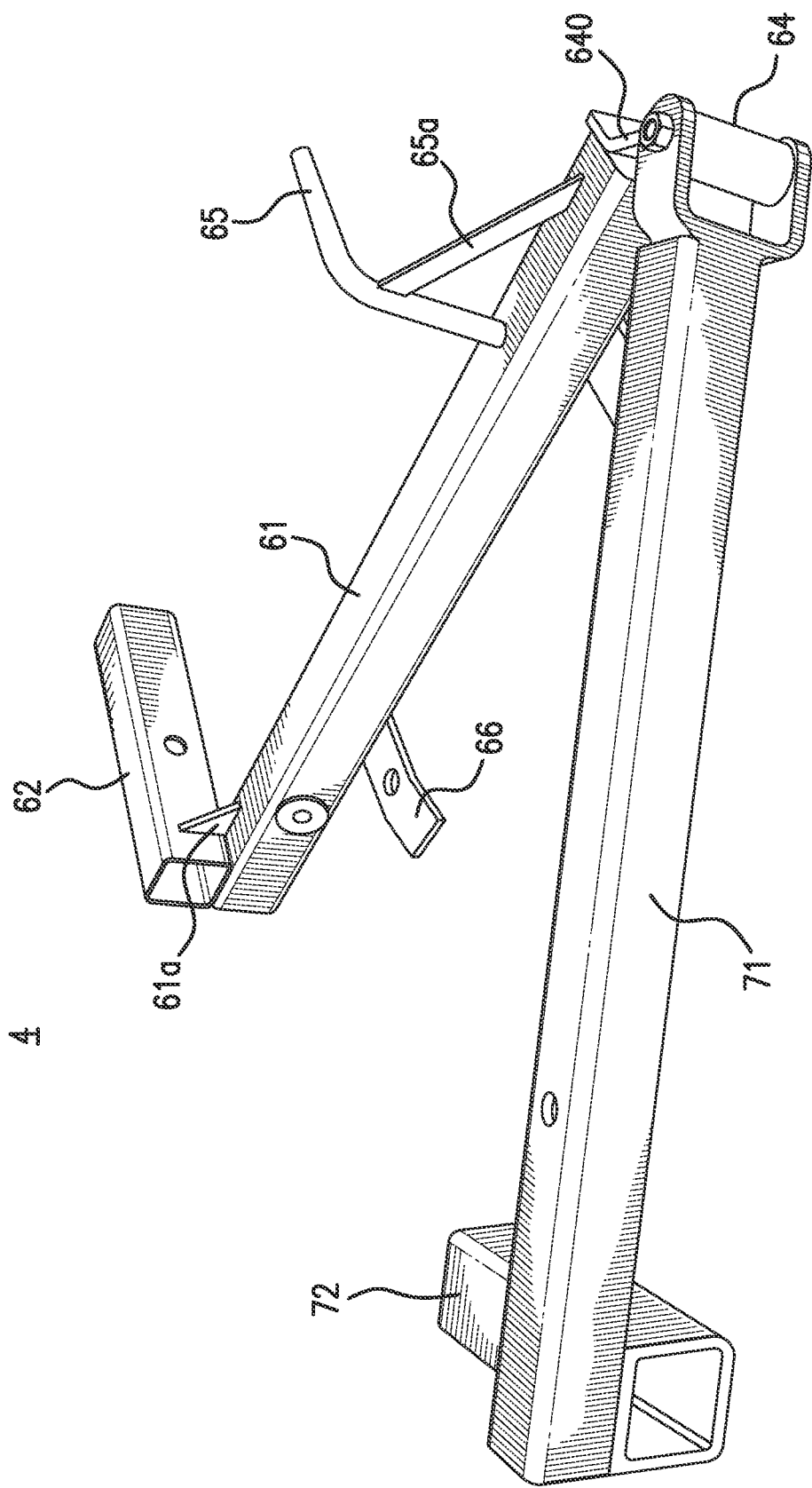
FIG. 12 is a perspective view looking forward from an outer side of the embodiment shown in FIG. 11; and, FIG. 13 is a perspective view looking forward from an outer side of the embodiment shown in FIG. 11, but in a closed configuration.
Figure 13:
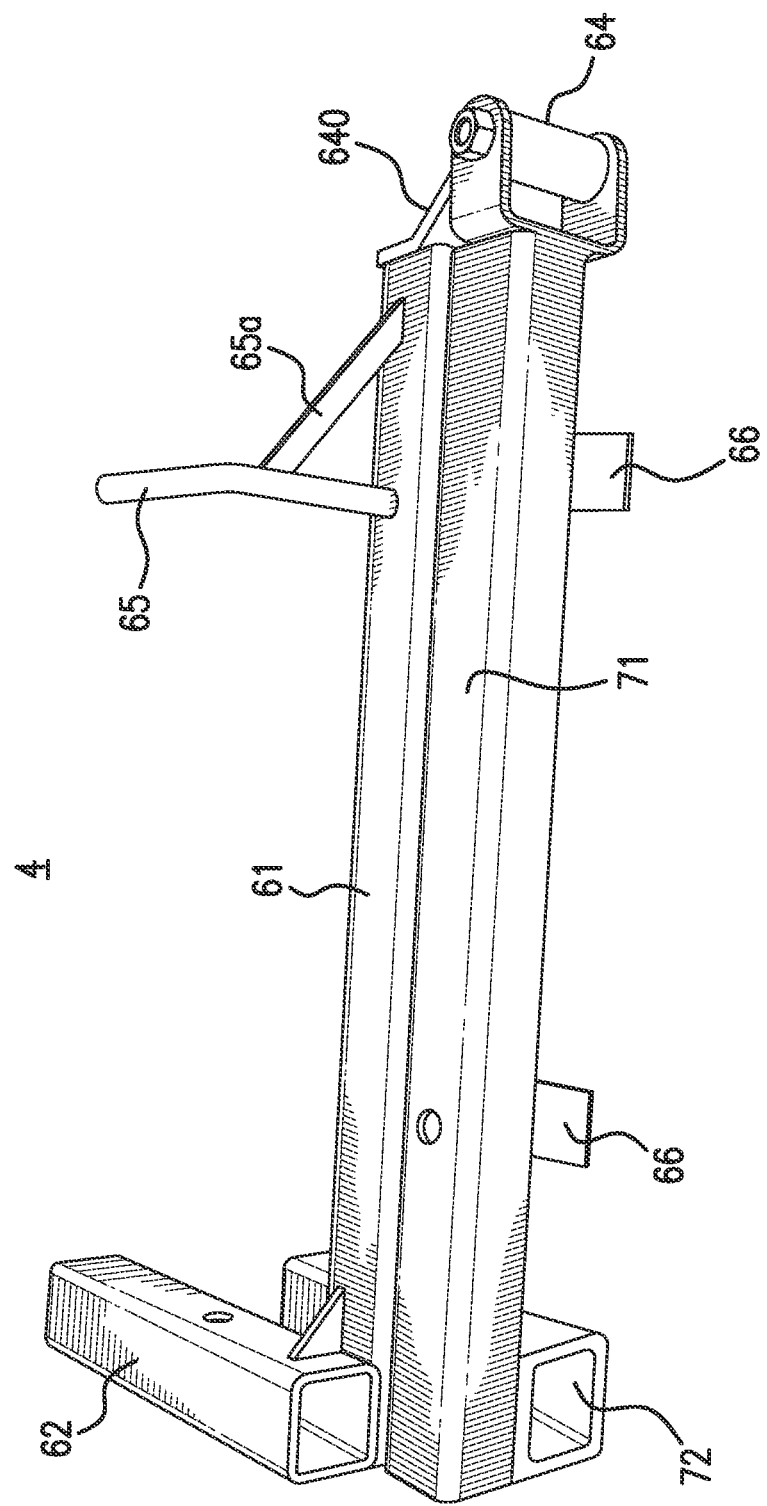

Turning to FIGS. 11-13, there are shown various views of a system 4 formed in accordance with another alternate embodiment of the present invention. System 4 shares similarities in overall structure and function with the systems of the preceding embodiments. In this embodiment, however, system 4 is configured for compact, lighter duty applications. As in the preceding embodiments, system 4 provides for a hitch sleeve configured for detachable hitch-mounted coupling to a given vehicle, while maintaining a hitch receiver to extend the vehicle's tow hitch for the hitch-mounting of other equipment notwithstanding the system's own mounting to the vehicle.

System 4 may be employed as in the preceding embodiments to detachably couple directly to the given vehicle for displaceably carrying various types of outboard utility equipment. Alternatively, system 4 may be employed in supplemental manner detachably coupled to a primary system 2, 3 formed in accordance with one or more of the preceding embodiments. That is, system 4 may be, for instance, detachably coupled to the tow receiver 12, 32 of the systems 2, 3 to provide supplemental functionality thereto.

As shown, system 4 includes a first portion 60 preferably formed to define a rigid main support frame structure 61 to which a second portion 70 is displaceably coupled in releasably locked manner. The first portion 60 may be detachably coupled by hitch mounting to a given vehicle, and the second portion 70 forms a movable arm-like structure 71 which may receive and carry the outboard utility equipment yet may be swung conveniently out of the way as needed. The arm-like structure 71 is pivotally coupled to the main support frame 61 by a hinge assembly 64, so as to swing open and closed in position. Much like the gate structures in the preceding embodiments, the arm structure 71 enables the mounted outboard utility equipment to be freely displaced out of the way for access to and through the main support frame structure 61 without dismounting or disassembly of that equipment.

The hinge assembly 64 is offset from an end of one of the first and second portions 60, 70—such as from one end the first portion 60 in the embodiment shown. The offset is sufficient to permit the arm structure 71 to nest longitudinally up against and along the main support frame structure 61 when closed. In that position, the arm structure 71 is supported on one or more latch plates 66 extending from the main support frame 21. It may be locked, or latched, to the first portion 60 to remain securely in place, and keep the utility equipment it carries securely in place, by passing a latching drop pin of any suitable configuration (such as shown for instance in FIGS. 2-3, 6, and 8 in connection with the preceding embodiments) in through one or more mutually aligned latch openings 66', 76' formed respectively in the arm-like structure 71 and supporting latch plate(s) 66 underneath.

The first portion 60 in this embodiment includes a first hitch receiver 62 which forms a hitch sleeve extending transversely from the main support frame structure 61 to insert into the vehicle's tow hitch receiver, or a hitch receiver of a primary system 2, 3. This first hitch receiver 62 is preferably though not necessarily also forms a hitch receiver opening at the opposite end to form an additional hitch extender. To reinforce its hitch mounting, the first portion includes a catch arm 65 configured to retentively hook onto a part of the vehicle's bumper or a primary system's frame member for hanging support. Overall rigidity of the first portion 60 is reinforced by one or more gussets 61*a*, 65*a* suitably formed on the main support frame 61 such as shown.

The second portion 70 preferably includes a mounting bracket for secure attachment of the utility equipment, preferably in the form of a second hitch receiver 72 that is configured to extend transversely from the arm structure 71. This second hitch receiver 72 may be of the same or of different size and/or shape relative to the first hitch receiver 62, depending on the particular requirements of the intended application. Since the arm structure 71 nests longitudinally against the main support frame structure 61 when closed, the second hitch receiver 72 is disposed on a distal outer surface of the arm structure 71 such that it remains clear of the main support frame structure 61 does not impede this closed positioning. Likewise, the first hitch receiver 62 is disposed on a distal outer surface of the main support frame structure 61 such that it does not impede this closed positioning either.

The given utility equipment may be carried on the pivotally displaceable second portion 70 by mounting directly to the arm-like structure 71 using any suitable fastening measures known in the art. Alternatively, the given utility equipment may be mounted via detachable engagement with the second hitch receiver 72. The utility equipment carried by system 4 may include, among other things, mechanisms like carriers for various other equipment or light duty machinery for actuation during vehicle operation.

Although this invention has been described in connection with specific forms and embodiments thereof, it will be appreciated that various modifications other than those discussed above may be resorted to without departing from the spirit or scope of the invention as defined herein. For example, functionally equivalent elements or processes may be substituted for those specifically shown and described, certain features may be used independently of other features, and in certain cases, particular locations of the elements or processes may be reversed or interposed, all without departing from the spirit or scope of the invention as defined herein.

What is claimed is:

1. A system for displaceable mounting of outboard utility equipment to a vehicle for selective in situ access to a utility compartment of the vehicle, comprising:
   a first portion configured for detachable coupling to the vehicle, said first portion being fixed in position relative to the vehicle when coupled thereto, said first portion including a main support frame defining an access opening for unimpeded access to the utility compartment when coupled to the vehicle, said first portion including a hitch receiver defining a tow hitch receptacle for auxiliary equipment, said first portion including a plurality of pockets coupled to said main support frame, each said pocket being configured for engagement of a lifting fork;
   a second portion displaceably coupled to said first portion for displacement between open and closed positions relative to said first portion, said second portion in the closed position extending across at least a portion of the access opening and in the open position remaining displaced from the access opening to maintain unobstructed access to the utility compartment therethrough, said second portion including a gate assembly and at least one mounting bracket coupled to said gate assembly and configured for attachment of the outboard utility equipment thereto; and,
   a latching structure coupled to said first and second portions for releasably locking said second portion in the closed position relative to said first portion.

2. The system as recited in claim 1, wherein said first portion defines a tow hitch sleeve configured for telescopic coupling to a tow hitch of the vehicle.

3. The system as recited in claim 2, wherein said hitch receiver is formed with a longitudinally extended tubular contour defining said tow hitch receptacle and tow hitch sleeve at longitudinally opposed ends thereof.

4. The system as recited in claim 3, wherein said first portion includes a plurality of gussets formed on said main support frame for reinforcing a rigidity thereof, at least one of said gussets forming a shield-like panel about said hitch receiver.

5. The system as recited in claim 1, wherein said gate assembly of said second portion is pivotally coupled to said main support frame of said first portion for angular displacement between the open and closed positions.

6. The system as recited in claim 5, wherein said main support frame forms a substantially U-shaped contour substantially bounding the access opening.

7. The system as recited in claim 5, wherein said first portion includes:
   a stopper member coupled to extend transversely from said main support frame;
   at least one hinge assembly coupled to said main support frame; and,
   a hinge plate projecting radially from said hinge assembly to connect to said gate assembly of said second portion, said hinge plate displacing angularly with said hinge assembly to be stopped by said stopper member when said gate assembly is displaced to the closed position.

8. The system as recited in claim 1, wherein said first portion includes a plurality of gussets formed on said main support frame, each of said gussets having a substantially planar plate-like contour.

9. The system as recited in claim 1, wherein said latching structure includes a locking drop pin engaging a free end of said gate assembly and an extension of said main support frame to lock said gate assembly in the closed position.

10. The system as recited in claim 1, wherein said latching structure includes complementary locking elements formed on mutually opposed surfaces of said main support frame and gate assembly, the locking elements when disposed one over the other being weight biased into retentive mutual retentive engagement by said gate assembly and the outboard utility equipment carried thereon.

11. The system as recited in claim 10, wherein said locking elements respectively define protrusive and complementarily sloped ramp features on said mutually opposed surfaces of the main support frame and gate assembly, and the retentive mutual retentive engagement of said locking elements is released upon said gate assembly being lifted against the weigh bias to displace an apex of one said ramp feature to an opposite side of an apex of the other said ramp feature.

12. The system as recited in claim 1, wherein said second portion includes at least one support leg pivotally coupled to said gate assembly for displacement between stowed and extended positions, said support leg in the extended position extending transversely downward from said gate assembly for supplemental support thereof against a supporting surface therebeneath.

13. A system for displaceable mounting of outboard utility equipment to a surface vehicle for selective in situ access to a cargo compartment of the vehicle, comprising:
- a first portion configured for hitch mounted coupling to the vehicle, said first portion being fixed in position relative to the vehicle when coupled thereto, said first portion including a main support frame of substantially U-shaped contour defining an access opening for unimpeded access to the cargo compartment when coupled to the vehicle, said first portion including a hitch receiver formed with a longitudinally extended tubular contour defining at one longitudinal end a tow hitch receptacle for auxiliary equipment and at another longitudinal end a tow hitch sleeve configured for telescopic coupling to a tow hitch of the vehicle, said first portion including a plurality of pockets coupled to said main support frame, each said pocket being configured for engagement of a lifting fork;
- a second portion pivotally coupled to said first portion for displacement between open and closed positions relative to said first portion, said second portion in the closed position extending across at least a portion of the access opening and in the open position remaining displaced from the access opening to maintain unobstructed access to the cargo compartment therethrough, said second portion including a gate assembly and at least one mounting bracket coupled to said gate assembly and configured for attachment of the outboard utility equipment thereto; and,
- a latching structure coupled to said first and second portions for releasably locking said second portion in the closed position relative to said first portion.

14. The system as recited in claim 13, wherein:
said first portion includes a plurality of gussets formed on said main support frame for reinforcing a rigidity thereof, at least one of said gussets forming a shield-like panel about said hitch receiver.

15. The system as recited in claim 13, wherein said first portion includes:
- a stopper member coupled to extend transversely from said main support frame;
- at least one hinge assembly coupled to said main support frame; and,
- a hinge plate projecting radially from said hinge assembly to connect to said gate assembly of said second portion, said hinge plate displacing angularly with said hinge assembly to be stopped by said stopper member when said gate assembly is displaced to the closed position.

16. The system as recited in claim 13, wherein said second portion includes at least one support leg pivotally coupled to said gate assembly for displacement between stowed and extended positions, said support leg in the extended position extending transversely downward from said gate assembly for supplemental support thereof against a supporting surface therebeneath.

17. The system as recited in claim 13, wherein said latching structure includes a locking drop pin engaging a free end of said gate assembly and an extension of said main support frame to lock said gate assembly in the closed position.

18. A system for displaceable mounting of outboard utility equipment to a surface vehicle for selective in situ access to a cargo compartment of the vehicle, comprising:
- a first portion configured for hitch mounted coupling to the vehicle, said first portion being fixed in position relative to the vehicle when coupled thereto, said first portion including a main support frame of substantially U-shaped contour defining an access opening for unimpeded access to the cargo compartment when coupled to the vehicle, said first portion including a hitch receiver is formed with a longitudinally extended tubular contour defining at one longitudinal end a tow hitch receptacle for auxiliary equipment and at another longitudinal end a tow hitch sleeve configured for telescopic coupling to a tow hitch of the vehicle;
- a second portion pivotally coupled to said first portion for displacement between open and closed positions relative to said first portion, said second portion in the closed position extending across at least a portion of the access opening and in the open position remaining displaced from the access opening to maintain unobstructed access to the cargo compartment therethrough, said second portion including a gate assembly and at least one mounting bracket coupled to said gate assembly and configured for attachment of the outboard utility equipment thereto; and,
- a latching structure coupled to said first and second portions for releasably locking said second portion in the closed position relative to said first portion;
- wherein said latching structure includes a locking drop pin engaging a free end of said gate assembly and an extension of said main support frame to lock said gate assembly in the closed position; and,
- wherein said extension of said main support frame defines a latch plate projecting transversely outward to support a portion of said gate assembly free end when in the closed position, said latch plate terminating at a tapered end flaring downward to guide said gate assembly free end into the closed position thereon.

* * * * *